United States Patent
Kanouda et al.

(10) Patent No.: US 7,626,353 B2
(45) Date of Patent: Dec. 1, 2009

(54) MOBILE TYPE INFORMATION TERMINAL AND SELF DIAGNOSIS METHOD AND OPERATION METHOD THEREOF

(75) Inventors: Akihiko Kanouda, Hitachinaka (JP); Mutsumi Kikuchi, Hitachi (JP); Yasuaki Norimatsu, Hitachinaka (JP); Junichi Kimura, Koganei (JP); Eisaku Fujita, Chofu (JP); Makoto Suzuki, Fuchu (JP); Akira Ishii, Higashiyamato (JP); Manabu Murakawa, Akishima (JP); Hideaki Koyama, Higashimurayama (JP); Kazuaki Adachi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 826 days.

(21) Appl. No.: 11/252,720

(22) Filed: Oct. 19, 2005

(65) Prior Publication Data
US 2006/0083955 A1 Apr. 20, 2006

(30) Foreign Application Priority Data
Oct. 19, 2004 (JP) .............................. 2004-304974
Oct. 19, 2004 (JP) .............................. 2004-304977

(51) Int. Cl.
H01M 10/44 (2006.01)
H02J 3/32 (2006.01)
(52) U.S. Cl. ........................................ 320/101; 307/46
(58) Field of Classification Search ................. 320/101; 307/46
See application file for complete search history.

(56) References Cited

U.S. PATENT DOCUMENTS 6,577,026 B1 * 6/2003 Faller et al. .................... 307/86
7,371,476 B2 * 5/2008 Aso ............................. 429/12

FOREIGN PATENT DOCUMENTS

| JP | 2002-259612 | 9/2002 |
|----|-------------|--------|
| JP | 2003-223918 | 8/2003 |
| JP | 2004-194434 | 7/2004 |
| JP | 2004-227832 | 8/2004 |
| WO | WO 2005/069418 | 7/2005 |
| WO | WO 2005/069419 | 7/2005 |

* cited by examiner

Primary Examiner—Patrick J Assouad
Assistant Examiner—Richard V Muralidar
(74) Attorney, Agent, or Firm—Antonelli, Terry, Stout & Kraus, LLP.

(57) ABSTRACT

When the mobile type information terminal is transferred between an operating state and a standby state, self diagnosis is performed. The fuel cell charges the secondary cells with a normal current of fixed value I1, and when the output voltage of the boost DC/DC converter (when PG=L), the charge current is reduced to the fixed value and aging is performed. After aging is performed for 60 seconds, charging is performed once again performed at the normal fixed value I1. This type of operation is repeated 30 times. During aging, when the output voltage from the boost DC/DC converter is reduced (when PG=L), aging is stopped and after 20 seconds aging is performed again, and this operation is done 10 times. The mobile type information terminal can perform self diagnosis and retrial of regeneration without the user being aware, in which secondary batteries and a fuel cell are loaded.

5 Claims, 12 Drawing Sheets

MOBILE TYPE INFORMATION TERMINAL AND SELF DIAGNOSIS METHOD AND OPERATION METHOD THEREOF

CLAIM OF PRIORITY

The present application claims priority from Japanese application Ser. No. 2004-304977, filed on Oct. 19, 2004, and from Japanese application Ser. No. 2004-304974, filed on Oct. 19, 2004, the contents of all of which are hereby incorporated by reference into this application.

FIELD OF THE INVENTION

This invention relates to a mobile type information terminal in which a fuel cell is loaded and to a self diagnosis method and operation method for this mobile type information terminal. This invention relates, for example, to a mobile type information terminal which is used as an information providing means for providing information pertaining to the objects being displayed to visitors to a public facility such as an exhibition site, and to a self diagnosis method and operation method for this mobile type information terminal.

BACKGROUND OF THE INVENTION

In recent years, due to advances in electronic technology, mobile electronic devices such as mobile telephones, notebook personal computers, audio/visual devices, camcorders, or personal digital assistants are rapidly becoming popular. These electronic devices are typically systems driven by secondary batteries and in order to extend the time of operation, conventional sealed lead storage batteries as well as Nickel-cadmium batteries, nickel Metal hydride batteries and also the new type of high energy dense secondary batteries such as lithium ion (Li ion) secondary batteries are usually loaded in these devices. As a result, advances are being made in making the mobile electronic devices lighter and more compact and thus higher functionality of the mobile electronic devices can be achieved. For the lithium ion secondary batteries in particular, the energy density is higher and thus advances are being made in the quality battery of activity and in high capacity battery structures. Also, much effort is being made to realize a battery power source with longer usage time for a single charging. As a result, capacity which is a number of times higher that than of the secondary batteries of the prior art in terms of capacity ratio has been realized.

However, the secondary batteries must be charged after a fixed amount of power is used, and because charging equipment and a comparatively long charging time is required, if a mobile electronic device is be used continuously over a long period without limits of time and location, it must be used while being charged.

A known use for a mobile electronic device is that in which a mobile information terminal device (called a mobile type information terminal) is distributed to visitors to a public facility such as a gallery or museum in order to provide information on the objects being displayed (see Japanese Patent Laid-Open 2002-259612: paragraphs 0011-0029 and FIGS. 1-9, for example). According to this technology, there is transmission between the mobile type information terminal held by the visitor and the exhibit, and information such as text, image and sound pertaining to the description of the exhibit can be displayed or generated. In the mobile type information terminal utilized for this purpose, it is particularly necessary for the mobile type information terminal to be used while sufficiently ensuring battery capacity for the secondary batteries. For this reason, a fuel cell is loaded in the mobile type information terminal along with the secondary batteries, and the battery capacity for the secondary cell is ensured by running the device while charging the secondary cell with the fuel cell (see Japanese Patent Laid-Open 2004-227832: paragraphs 0014-0043 and FIGS. 1-7, for example).

Known examples of the fuel cell include one in which liquid fuel is oxidized in a MEA (Membrane Electrode Assembly) anode including anode, an electrolytic film, a cathode and a dispersion layer, and oxygen is reduced by the cathode, and in the technology of Patent Document 2, the direct methanol fuel cell (DMFC) is used as a typical fuel cell.

When a fuel cell is used in this manner, in order to prevent characteristic deterioration of the fuel cell, the secondary cell is appropriately charged while self diagnosis of the charge circuits including the fuel cell is performed. For example, technology is disclosed in which the resistance value for membrane resistance is obtained based on the voltage generated for the membrane resistance of the fuel cell and the resistance value of the reaction resistance is obtained based on the current value which is supplied for reaction resistance and the voltage value generated for reaction resistance. The effective resistance of the fuel cell is then efficiently obtained in a short time from the membrane resistance and the reaction resistance previously obtained, and self diagnosis to determine whether the fuel cell is undergoing characteristic deterioration is performed (see Japanese Patent Laid-Open 2003-223918: Claim 1 and FIG. 1, for example).

Known examples of the fuel cell include one in which liquid fuel is oxidized by a MEA (membrane electrode assembly) anode including an anode, an electrolytic film, a cathode and a dispersion layer, and oxygen is reduced by the cathode, and in the technology of Patent Document 2, the direct methanol fuel cell (DMFC) is used as a typical fuel cell. In addition, technology is known in which the secondary battery and the DMFC are loaded in a mobile telephone and the capacity of the secondary battery is ensured by charging the secondary battery from the DMFC as necessary (See Japanese Patent Laid-Open 2004-1944434, Claim 1 and FIG. 1 for example).

SUMMARY OF THE INVENTION

However, when being used for different purposes, the mobile type information terminal must always ensure battery capacity for the secondary batteries, and depending on the environment in which the mobile type information terminal is used, it may be necessary to use the device for a very long time. For example, in the environment of a large exposition or exhibition where there is an extremely large number of visitors, if the number of mobile type information terminals being distributed to the visitor is not enough, and there is not enough time to charge the mobile type information terminals, providing more mobile type information terminals is the only way to solve the problem. Also, for the duration of the exhibition or the like, providing the visitor with mobile type information terminals with sufficient battery capacity by regularly by distributing, collecting and charging the mobile type information terminal is a big responsibility to be shouldered by the staff. Furthermore, in order to prevent mobile type information terminals with insufficient battery capacity from being distributed to visitors, the staff must be able to accurately and quickly determine the charge state of the mobile type information terminal.

Loading a plurality of secondary batteries to ensure battery capacity can be considered in order to solve these problems, but in this case, the advantage of being a handy type mobile information terminal is compromised and thus this is not a suitable method.

Furthermore, even if the mobile type information terminal such as that disclosed in Japanese Patent Laid-Open 2004-227832 in which the secondary batteries and direct methanol fuel cell (DMFC) are loaded is used, when the power source of the mobile type information terminal is turned OFF (or in other word at the time when it is returned or the like), because the secondary batteries are being charged by the DMFC, in the case where the distribution and collection cycle for the mobile type information terminals is short, or in the case where the mobile type information terminal is out for a long period and the remaining battery capacity is small, sufficient time for charging cannot be ensured, and it may not be possible to hand a mobile type information terminal which is fully charged to next visitor.

Furthermore, in the case where the fuel cell is used over a long period of time, output properties may deteriorate due to air bubbles or water droplets, and when the fuel cell is to be used in the next cycle, the starting properties sometimes deteriorate. In this state, there is the possibility that the fuel cell may not charge the secondary cells properly. In addition, in the fuel cell self diagnosis method according to the technology of Japanese Patent Laid-Open 2003-223918, accurate self diagnosis of compromised output properties or starting properties of the mobile type information terminal caused by air bubbles or water droplets is not possible. Thus, early detection of deterioration of the fuel cell is not possible and consequently, the fuel cell may not properly charge the secondary cells.

The first object of this invention is to provide a mobile type information terminal which solves problems such as those described above, and in which self diagnosis of the fuel cell and retry of regeneration is performed without the user being aware, when comparatively small capacity secondary batteries and fuel cell are loaded to effectively perform charging and discharging, and which is thus excellent for use.

The second object of this invention is to provide a mobile type information terminal which solves problems such as those described above, and in which the power for use can be sufficiently ensured by loading secondary batteries and fuel cells and effectively charging the secondary batteries, as well as an operation method for the mobile type information terminal.

In order to achieve the first object, the mobile type information terminal which is a preferred embodiment of this invention comprises secondary batteries for performing charging; a fuel cell for charging the secondary batteries; a display means for displaying information in the operating state of the mobile type information terminal, but for not displaying information in the standby state in which operation of the mobile type information terminal is stopped; wherein self diagnosis is performed by the operation of transferring from the operating state to the standby state, and if there is no abnormality, the transfer is immediately performed, while if there is an abnormality, a description of the abnormality is displayed at the display means.

Further, in the mobile type information terminal which is a preferred embodiment of this invention, when self diagnosis is performed by the operation of transferring from the standby state to the operating state, if there is no abnormality, the operation state is immediately performed and an initial screen is displayed at the display means, while if there is an abnormality, a description of the abnormality is displayed at the display means.

In addition, in order to achieve the first object, the mobile type information terminal which is a preferred embodiment of this invention is a mobile type information terminal for providing information prescribed information comprising: a plurality of sets of secondary batteries which each independently performs charging; a fuel cell for charging the secondary batteries; a charging means for individually charging the plurality of sets of secondary batteries from the fuel cell; a boost DC/DC converter which is interposed between the fuel cell and the charging means and has a shut down function for stopping operation when abnormal voltage is generated in the fuel cell; wherein retrial of generation for a different charge mode for the fuel is cell is performed based on a first charge current command value sent by the charging means and a second charge current command value of not more than ½ of the first charge current command value and a logic signal corresponding to normal/abnormal output voltage of the boost DC/DC converter.

Furthermore, in the mobile type information terminal which is a preferred embodiment of this invention, the power capacity of the fuel cell is the average power consumption terminal in the operating state in which the mobile type information terminal is caused to operate.

Also, this invention is a self diagnosis method for the mobile type information terminal which comprises secondary batteries, a fuel cell and a charging means for charging the secondary batteries from the fuel cell and a boost DC/DC converter which is interposed between the fuel cell and the charging means and has a function for stopping operation when abnormal voltage is generated in the fuel cell; wherein the first charge current command value and the second charge current command value which is smaller than the first charge current command value which are sent by the charging means and the logic signal corresponding to normal/abnormal output voltage of the boost DC/DC converter are utilized and the method comprises: a step for charging the secondary batteries using the first charge current command value when the fuel cell is started; a step for changing the charge current command value to the second charge current command value and charging the secondary cells over a prescribed time in the case where the logic signal is a signal that indicates abnormality of the boost DC/DC converter; and a step for charging the secondary batteries by changing the charge current command value back to the first charge current command value after the prescribed time has elapsed.

Furthermore, in the self diagnosis method for the mobile type information terminal which is a preferred embodiment of this invention, the second charge current command value is not more than ½ of the first charge current command value.

Furthermore, in the self diagnosis method for the mobile type information terminal which is a preferred embodiment of this invention, if changing of the charge current command value exceeds a prescribed frequency, abnormal information for the fuel cell is stored in a memory means and the abnormal information is displayed at the time of the next self diagnosis.

Also, in the self diagnosis method for the mobile type information terminal which is a preferred embodiment of this invention, in the case where the charge current command value is the second charge current command value, and the logic signal corresponds to the abnormality of the boost DC/DC converter, the charging means and the boost DC/DC converter are stopped, and after a prescribed time has elapsed, operation of the boost DC/DC converter is resumed and the secondary batteries are charged at the second charge current command value.

Furthermore, in the self diagnosis method for the mobile type information terminal which is a preferred embodiment of this invention, when stopping of the charging means exceeds a prescribed frequency, abnormal information for the fuel cell is stored in the memory means and the abnormal information displayed at the time of the next self diagnosis.

The mobile type information terminal which is a preferred embodiment of this invention was created in view of achieving the first object, and may, for example, comprise a direct method fuel cell (DMFC hereinafter) and a plurality of sets of lithium ion secondary batteries (lithium ion batteries hereinafter). In addition, regardless of whether the power source for the mobile type information terminal is in the ON state or the OFF state, one of the lithium ion batteries is always being charged from the fuel cell and the load of the mobile type information terminal is being supplied with power from the other lithium ion batteries. In this manner, in the case where one lithium ion battery of the plurality of sets of lithium ion batteries that are loaded in the mobile type information terminal is charged by the DMFC, self diagnosis to determine whether proper charging of the mobile type information terminal is always being carried out is necessary. In order to do this, when the mobile type information terminal is transferred from the operating state to the standby state or from the standby state to the operation state, self diagnosis is performed and in the case where there is no abnormality the transfer is immediately made to the standby state or the operating state, while if there is an abnormality, the description of the abnormality is displayed. At this time, when the transfer is being made between the operating state and the standby state, by changing the size of the charge current command value and utilizing the logic signal corresponding to normal/abnormal output voltage of the boost DC/DC converter that is interposed between the fuel cell and the charging means and thereby perform retrial of generation in a different charge mode for the fuel cell, the lithium ion battery can be optimally charged while performing proper self diagnosis.

In order to achieve the second object, the mobile type information terminal of this invention, comprises: a fuel cell for operating the mobile type information terminal; a plurality of sets of secondary batteries which each are independently charged and discharged; a first charging means which selects one set of secondary batteries from among the plurality of sets of secondary batteries in the operating state and in the standby state in which operation of the mobile type information terminal is stopped and charges the set of secondary batteries from the fuel cell and charges power from the other sets of secondary batteries to a load; and a switching means for performing switching of the charging and discharging systems for the plurality of sets of secondary batteries at a prescribed timing.

Furthermore, in the mobile type information terminal of this invention, the power capacity of the fuel cell is less than the average power consumption in the operating state in which the mobile type information terminal is caused to operate.

In addition, in the mobile type information terminal of this invention, the mobile type information terminal comprises a display means which displays information in the operating state of the mobile type information terminal and does not display information in the standby state.

Also, in the mobile type information terminal of this invention, the prescribed timing for performing switching of the charging and discharging systems is the timing for transfer from the operating state to the standby state; the timing for reading information on the IC chip that is attached to a prescribed location, or the timing when a prescribed amount of time has elapsed.

Also, in the mobile type information terminal of this invention, the timing for the transfer from the operating state to the standby state is the timing for reading information on an IC chip that is specified in advance from among all the IC chips.

Furthermore, the mobile type information terminal of this invention comprises a second charging means for supplying power to the load while charging the plurality of secondary batteries from the commercial power source, and when the second charging means performs the charging operation in the standby state, the first charging means stops the charging operation.

In addition, in order to achieve the second object the method for operating the mobile type information terminal which comprises: a fuel cell; a plurality of secondary batteries; an antenna which performs wireless communication with an IC chip for recording information; a reader which reads IC chip information which the antenna receives and a display means for displaying the information, and which is lent to a visitor, the method comprising: a step in which the fuel cell charges one set of secondary battery from among the plurality of secondary batteries by operating the operation button for the mobile type information terminal and in which the mobile type information terminal is transferred from the standby state to the operation state when the other sets of secondary batteries supply power to the load; a step of holding up the mobile type information terminal to the IC chip that has been attached to a desired object in the operating state, and in which the reader reads the information recorded on the IC chip via the antenna and displays the information pertaining to the object on the displaying means; and a step of reading the specified IC chip information into the mobile type information terminal, and transferring from the operating state to the standby state and switching the charging and discharging system for the plurality of sets of secondary batteries.

Furthermore the operation method for the mobile type information terminal of this invention comprises: a step of stopping the charge function using the fuel cell and charging the plurality of sets of secondary cells using the commercial power source after the cycle for the process of transferring from the standby state to the operating state and the process of transferring from the operation state to the standby state has been repeated a prescribed number of times.

In addition, in the operation method for the mobile type information terminal of this invention, the timing for charging the plurality of sets of secondary batteries using the commercial power source is once each day and is a time when there are no visitors using the defined region.

Also, in the operation method for the mobile type information terminal of this invention, by changing the method for transferring from the standby state to the operating state in accordance with the characteristics of the visitor using the defined region, the information content displayed by the display means can correspond to the characteristics of the user.

Furthermore, in the operation method for the mobile type information terminal of this invention, the mobile type information terminal is transferred from the standby state to the operating state and before being lent out, the fuel state of the fuel cell is checked, and in the case where the fuel is less than a prescribed amount the fuel cartridge is replaced.

The mobile type information terminal of this invention was created for achieving the second object and has, for example, a direct methanol fuel cell (simply DMFC hereinafter) as the fuel cell and a plurality of sets of Li ion secondary batteries (simply Li ion batteries hereinafter) as the secondary batteries loaded therein. In addition, regardless of whether the power source for the mobile type information terminal is in the ON state or the OFF state, one of Li ion batteries is always being charged from the fuel cell and power is supplied to the load of the mobile type information terminal by the other sets of Li ion batteries. Due to this type of configuration, the mobile type information terminal is switched to the operating state by pushing the operation button thereof. Thus, when the visitor holds up the mobile type information terminal to the display object, the antenna and reader that are attached to the mobile type information terminal read the information of the RFID (Radio Frequency Identification), namely the IC chip, that is mounted close to the display object and information for the display object is displayed as text and images and sound is played.

Furthermore, when the visitor returns the mobile type information terminal, if the staff holds the mobile type information terminal toward a prescribed RFID chip, the power source of the mobile type information terminal is turned off and transferred to the standby state by information recorded on the prescribed RFID chip (specific IC chip). At this time, the charging and discharging system for the plurality of sets of secondary batteries is switched. That is to say, the secondary batteries that were previously charged by the fuel cell are connected to the load and the secondary batteries that were previously connected to the load are switched to the charging system of the fuel cell. The mobile type information terminal is lent to the next visitor in this state and then it goes into the operating state. In addition, at times when there are no visitors to the exhibition site, such as at night and when the site is closed, the function of charging from the fuel cell can be stopped and the plurality of sets of secondary batteries can be charged using the commercial power source.

According to this invention, regardless of whether the mobile type information terminal is in the standby state or the operating state, one set of the secondary batteries from among the plurality of sets of secondary batteries (such as the lithium ion batteries) is always being charged from the fuel cell (such as the DMFC). Thus, during daytime operation at exhibition sites, charging of the secondary batteries using commercial power sources is unnecessary and so the burden on staff when distributing and collecting the mobile type information terminal is lightened.

In addition, when the mobile type information terminal is transferred from the operating state to the standby state or from the standby state to the operation state, self diagnosis is performed and in the case where there is no abnormality the transfer is immediately made to the standby state or the operating state, while if there is an abnormality, a description of the abnormality is displayed. Thus the secondary batteries are always properly charged and at the same time response can be quick if there is a malfunction. As a result, a mobile type information terminal excellent for use can be provided to the staff of exhibitions and the visitors to the exhibitions.

Furthermore, by reading the information on the prescribed IC chip when the mobile type information terminal is returned, the power source of the mobile type information terminal is turned off and the device is transferred to the standby state and thus wasteful power consumption due to forgetting to turn off the device is prevented. In addition, at this time, the charging system of the secondary batteries (such as the Li ion batteries) by the fuel cell (such as the DMFC) is automatically switched, and thus all of the secondary batteries that are loaded in the mobile type information terminal can operate in a state in which charging is well balanced. Also during the night and the like when the secondary batteries are charged by the commercial power source, the charge function using the fuel cell is automatically stopped. As a result, a mobile type information terminal which is convenient for use for both staff and visitors to the exhibition site is provided.

DESCRIPTION OF THE PREFERRED EMBODIMENTS

Figure 1:
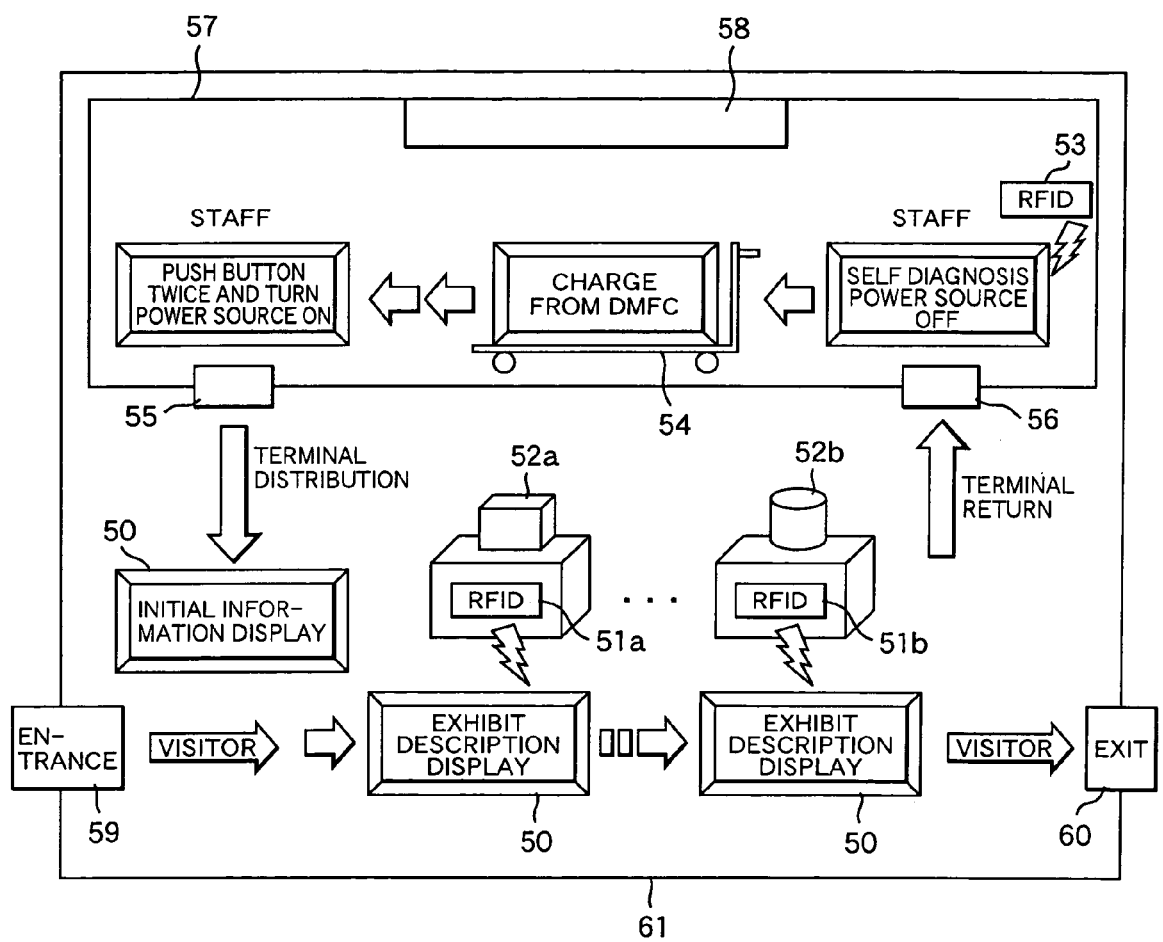
FIG. 1 is an explanatory diagram showing the method of operation of mobile type information terminal having a fuel cell of this invention.

The following is a description with reference to the drawings of some embodiments of the mobile type information terminal of the invention in which a fuel cell is loaded, which is for describing objects being displayed in an exhibition. A method of self diagnosis and a method of operation are also described.

In a preferred embodiment of this invention, the mobile type information terminal has a direct method fuel cell (simply DMFC hereinafter) as the fuel cell and the lithium ion secondary batteries (simply lithium ion batteries hereinafter) as the secondary batteries. In addition, regardless of whether the power source for the mobile type information terminal is in the ON state or the OFF state, a lithium ion battery is always being charged from the DMFC. This mobile type information terminal has stored therein, instructions for use for the visitors, and immediately before the mobile type information terminal is distributed or lent out to the visitor, a button on the mobile type information terminal, a staff pushes a button on the mobile type information terminal for turning ON the power supply. The power supply is thus turned ON and user information on how to use the device is displayed on the screen. Also, the mobile type information terminal has a reader for reading the information recorded on the RFID (Radio Frequency Identification) chip and an antenna. When the visitor approaches a exhibit in the exhibition, transmission of information takes place between the RFID chip that is in the object and the mobile type information terminal. Thus, information sent from the RFID chip and the memory inside the mobile type information terminal, large capacity hard disk device or removable disk (also called iVDR: Information Versatile Disk for Removable usage) and image data, text and sound pertaining to the corresponding exhibit is generated. Hereinafter, this type of mode in the mobile type information terminal is called the operating state.

In addition, after the mobile type information terminal is returned by the visitor, and the staff receives the mobile type information terminal, the mobile type information terminal goes into the self diagnosis mode by reading prescribed information from a specific RFID chip. In addition, the after the state of the DMFC and the charge state of the lithium ion batteries are checked, if the charge state for them are normal, the power source of the mobile type information terminal is automatically turned OFF, and the mobile type information terminal goes into the mode in which charging is only from DMFC to the lithium ion batteries. The mobile type information terminal that has entered the charging mode is distributed again one after the other while being managed in the backyard. During the night and the like when the exhibition is closed, the lithium ion batteries are directly charged by an AC charging device (commercial power) installed in the backyard, and the lithium ion batteries are charged until the next exhibition time. In the case where the charging is done using the AC charging device, charging by the DMFC is stopped. This kind of mode of the mobile type information terminal is called the standby state hereinafter. In this manner, the lithium ion batteries are charged by the DMFC during the exhibition and charging of the lithium ion batteries by and AC charging device is performed after the exhibition while switching the charge mode of the mobile type information terminal between the operating state and the standby state. As a result, a mobile type information terminal can be operated in which sufficient charge capacity of the lithium ion batteries can be ensured even if the capacity of the lithium ion batteries decrease, without charging from the AC charging device during exhibition time.

In addition, 2 sets of lithium ion batteries that are capable of being charged independently are provided, and the role of charging is divided between the lithium ion batteries that are charged from the DMFC in the operating state (called charge side lithium ion batteries hereinafter) and the lithium ion battery cell that supplies electricity to the load in the operating state (called supply side lithium ion batteries hereinafter). When the mobile type information terminal is returned by the visitor and information is read from a specific RFID chip, the roles of the respective lithium ion battery cells are switched. That is to say, the charge side lithium ion batteries in the previous operating state become the supply side lithium ion batteries in the next operating state, and the supply side lithium ion batteries in the previous operating state become the charge side lithium ion batteries in the next operating state. In addition, the capacity of 2 sets of the lithium ion batteries is monitored using the state of charge control function of the secondary batteries (called SOC hereinafter), and the lithium ion batteries with less remaining charge switches to the DMFC charging system so that it may be charged from the DMFC. Furthermore, there may be some variance in the starting time of the fuel cell, and thus problems with the starting of the fuel cell may be solved by monitoring the PG signals of the DC/DC converter and providing a means for changing the charge current command value for the lithium ion batteries.

Furthermore, when the mobile type information terminal is transferred from the operating state to the standby state or from the standby state to the operating state, self diagnosis is performed. This self diagnosis the lithium ion batteries from the DMFC with a normal charge current for example, and in the case where the output voltage from the boost DC/DC converter decreases (or in other words in the case where the PG signal becomes L), the charge current is reduced and aging is performed. In addition, after aging has been performed for 60 seconds, the normal charge current is returned to, and this operation is repeated 30 times. In addition, if the output voltage of the boost DC/DC converter reduces during the aging (or in other words in the case where the PG signal becomes L), the aging is stopped and after 20 seconds aging is performed again, and this operation is repeated 10 times. Even when this retrial of generation is performed, if there is abnormality, the DMFC abnormality is displayed.

Next, the first embodiment of the mobile type information terminal of this invention will be described using the drawings. FIG. 1 is an explanatory drawing showing the method for operating the mobile type information terminal in which a fuel cell is loaded of this invention. First, the flow of the operation of the mobile type information terminal 50 in which a fuel cell is loaded of this invention will be schematically described using FIG. 1. When the visitor enters the exhibition hall 61 from the entrance 59, the staff distributes the mobile type information terminal 50 to the visitors from the distribution window 55. Before handing the mobile type information terminal 50 to the visitor, the staff presses a button on the mobile type information terminal 50 twice for turning ON the power source. When the power source of the mobile type information terminal 50 is thereby turned ON, a first information screen which displays the operation method of the device is displayed. The visitor will be able to understand how to use the mobile type information terminal 50 based on the information displayed at the information screen. Next, using the operation method, displayed on the information screen, the visitor takes the mobile type information terminal 50 towards the exhibit 52a for example, information is transmitted between the RFID chip 51a that is in the exhibit 52a and the RFID reader in the mobile type information terminal 50 (see FIG. 6). As a result, information pertaining to the exhibit 52a from the iVDR 47 formed of a large capacity hard disk and memory 63 which are built into the mobile type information terminal 50 (see FIG. 6) is generated as image, text or sound. Information relating to the exhibit 52b is generated in a similar manner in accordance with information from the RFID chip 51b which is in the exhibit 52b. At this time, one of lithium ion batteries becomes the supply side lithium ion batteries and the other lithium ion batteries are charged by the DMFC.

In this manner, after the visitor generates information on prescribed exhibits using the mobile type information terminal 50 while moving around the exhibition hall, the visitor returns the mobile type information terminal 50 at the return window 56 which is close to the exit 60. After the staff receives the mobile type information terminal 50, the mobile type information terminal 50 is brought close to a specific RFID chip 53 and information for self diagnosis is read. The mobile type information terminal 50 thus goes into the self diagnosis mode. The DMFC state and charge state of the lithium ion batteries are checked in the self diagnosis mode. After the DMFC state and charge state of the lithium ion batteries are automatically checked, if the charge state is normal, the power source of the mobile type information terminal 50 is automatically turned OFF, and the device goes into the mode where the lithium ion batteries are only charged from the DMFC. At this time, the switching of the charge system is such that the supply side lithium ion batteries in the previous operating state become the charge side lithium ion batteries that are charged from the DMFC, and the charge side lithium ion batteries in the previous operating state become the supply side lithium ion batteries in the next operating state.

It is to be noted that when the charge system of the mobile type information terminal 50 is switched by reading information from a specific RFID chip 53 when the mobile type information terminal 50 is returned, the lithium ion batteries at the side which always has small amount of remaining charge is switched to the DMFC charging system by SOC determination and thus there is no possibility that the lithium ion batteries which are fully charged are switched to the DMFC charging system.

Also, the mobile type information terminal 50 which has been returned is conveyed to the distribution window 55 by the cart 54 while being charged by the DMFC. Also, during the night or the like when the exhibition site is closed, the supply side lithium ion batteries and the charge side lithium ion batteries are charged directly by the AC charging device (charging rack) 58 installed in the backyard. At this time, charging by the DMFC is terminated. In this manner all the lithium ion batteries are fully charged by the time the exhibition site is opened.

Figure 2:
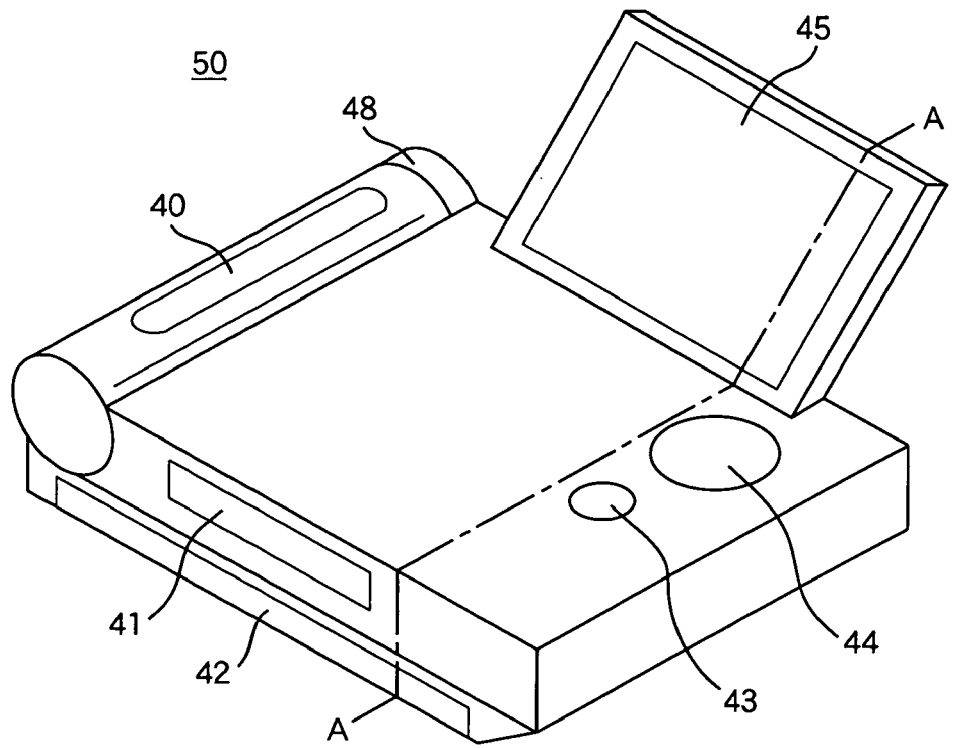
FIG. 2 shows the exterior of the mobile type information terminal
Figure 3:
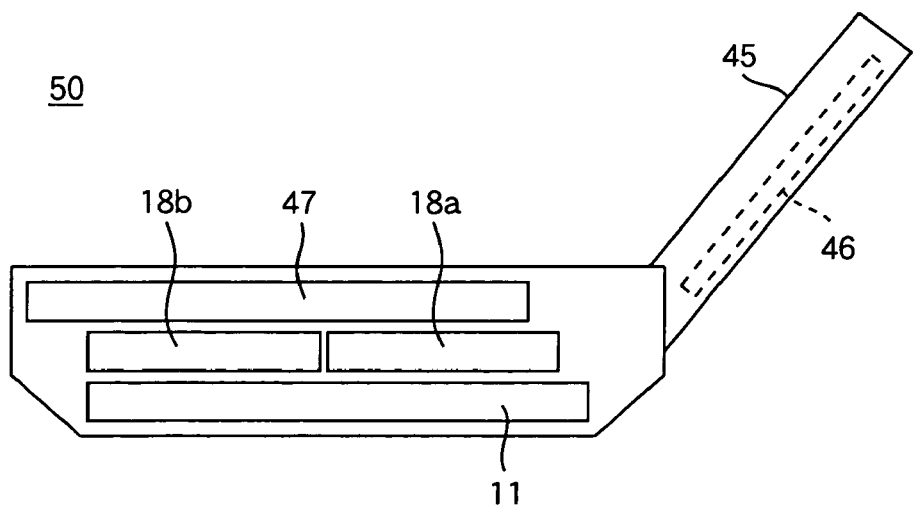
FIG. 3 shows the cross-section along A-A of the mobile type information terminal shown in FIG. 2

FIG. 2 shows the exterior of the mobile type information terminal, and FIG. 3 shows the cross-section along A-A of the mobile type information terminal shown in FIG. 2

Figure 4:
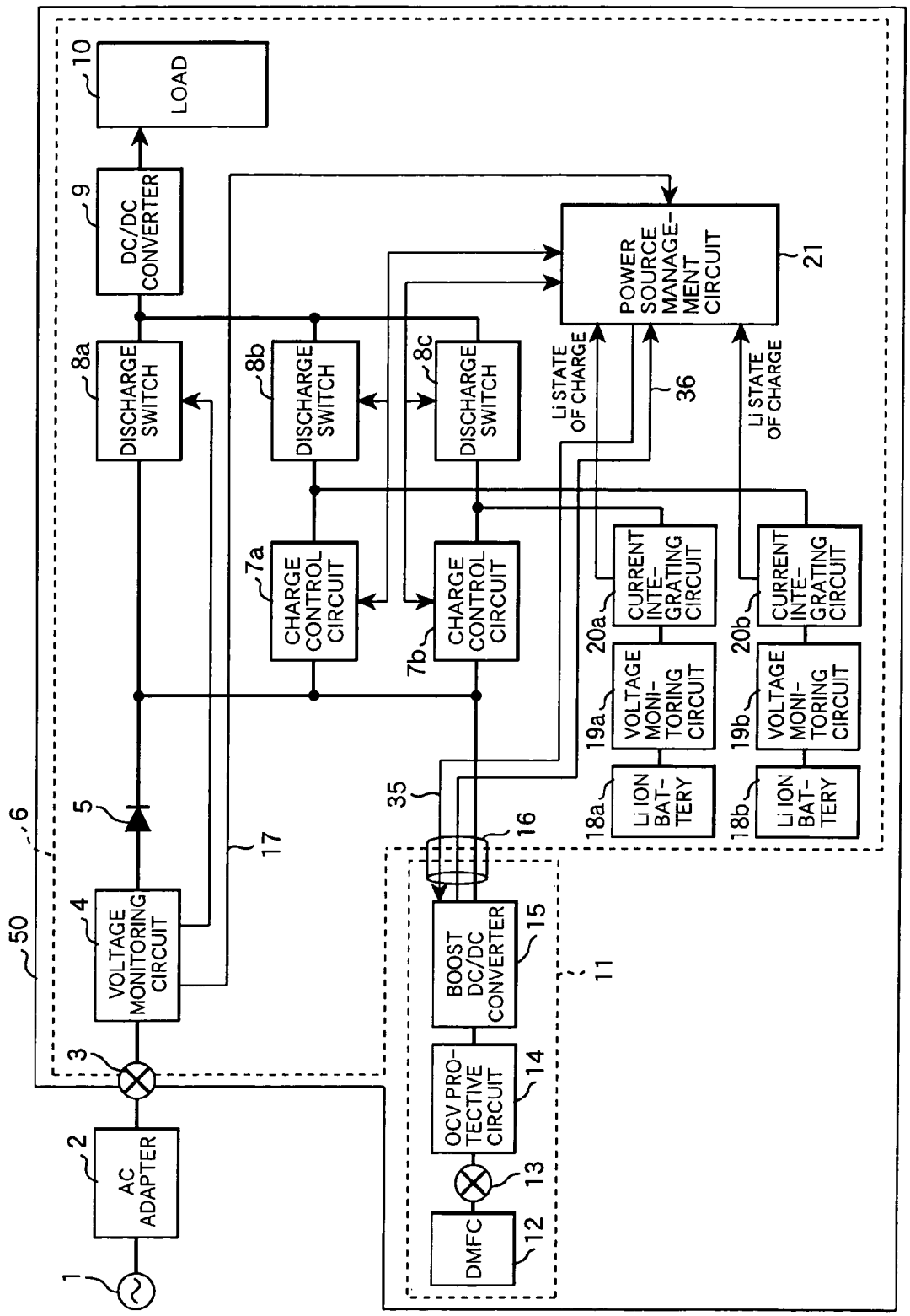
FIG. 4 shows the power source circuit system for the mobile type information terminal of this invention.
Figure 5:
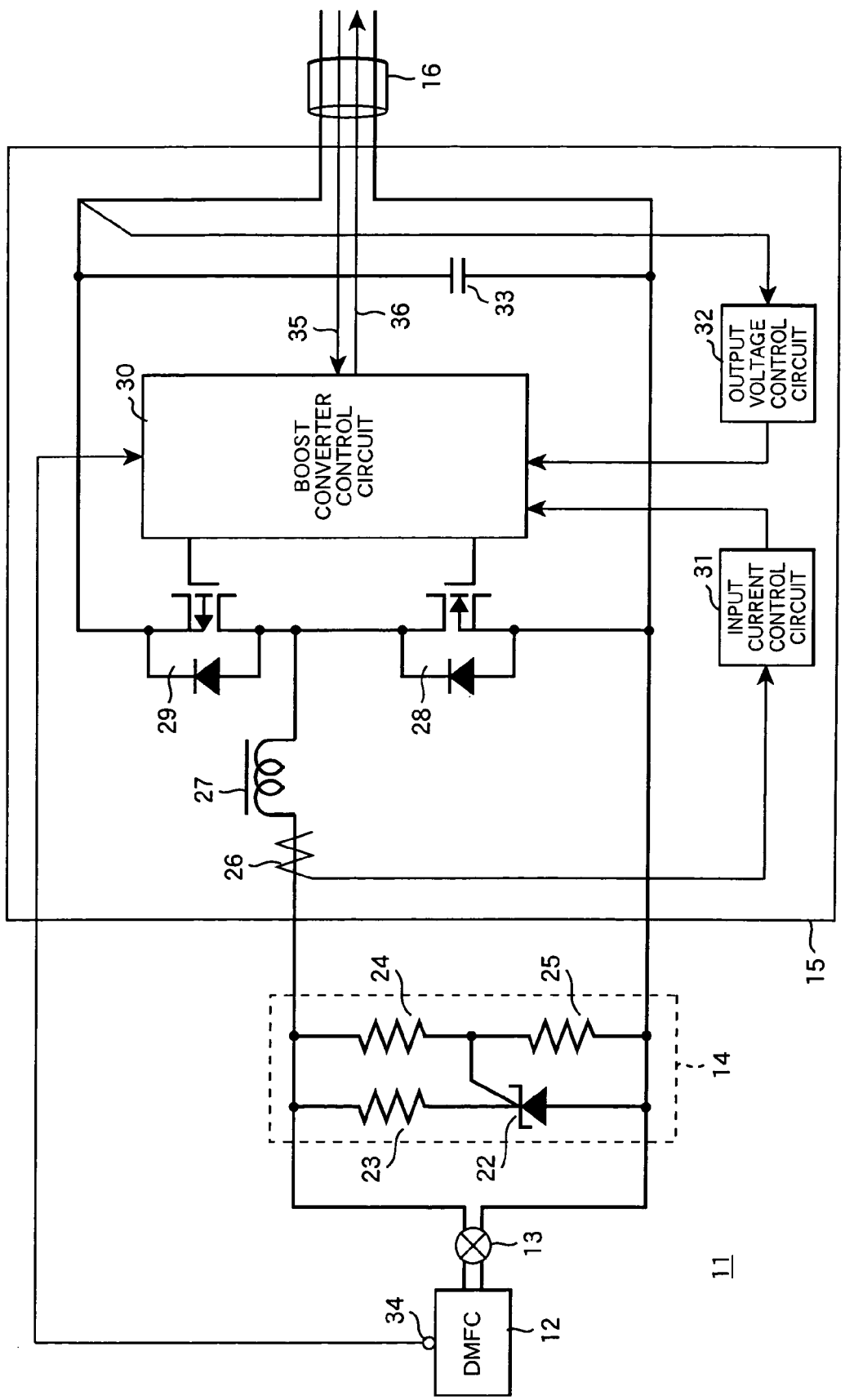
FIG. 5 is a circuit map showing the details of the circuit comprising inner part of the fuel cell unit from among the circuit configurations of the power source control system shown in FIG. 4.

As shown in FIG. 2, the mobile type information terminal 50 has a iVDR eject port 41 and a air hole 42 at the side portion at the front of the mobile type information terminal 50 and buttons 43 and 44 which can be operated by the staff or the visitors are disposed on the operation surface. A liquid crystal screen 45 whose incline angle can be changed to facilitate viewing is disposed at the rear portion of the front. A cartridge replacement port 48 which is used for replacing the fuel cartridge of the fuel cell is provided at the left side of the main body and fuel level check window 40 is provided on the surface thereof. As shown in the cross-sectional view in FIG. 3, an iVDR 47 comprising the fuel cell unit 11, lithium ion battery 18a, lithium ion battery 18b, a hard disk and the like is accommodated inside the mobile type information terminal 50. Furthermore, the back surface of the case of the liquid crystal screen 45 has a RFID antenna 46. The DMFC is stored in the fuel cell unit 11. The mobile type information terminal 50 has a power source circuit system as shown in FIG. 4 and FIG. 5, and control of charge and discharge is performed for the lithium ion battery 18a and the lithium ion battery 18b. The power source circuit display system is described in detail in the following.

Figure 6:
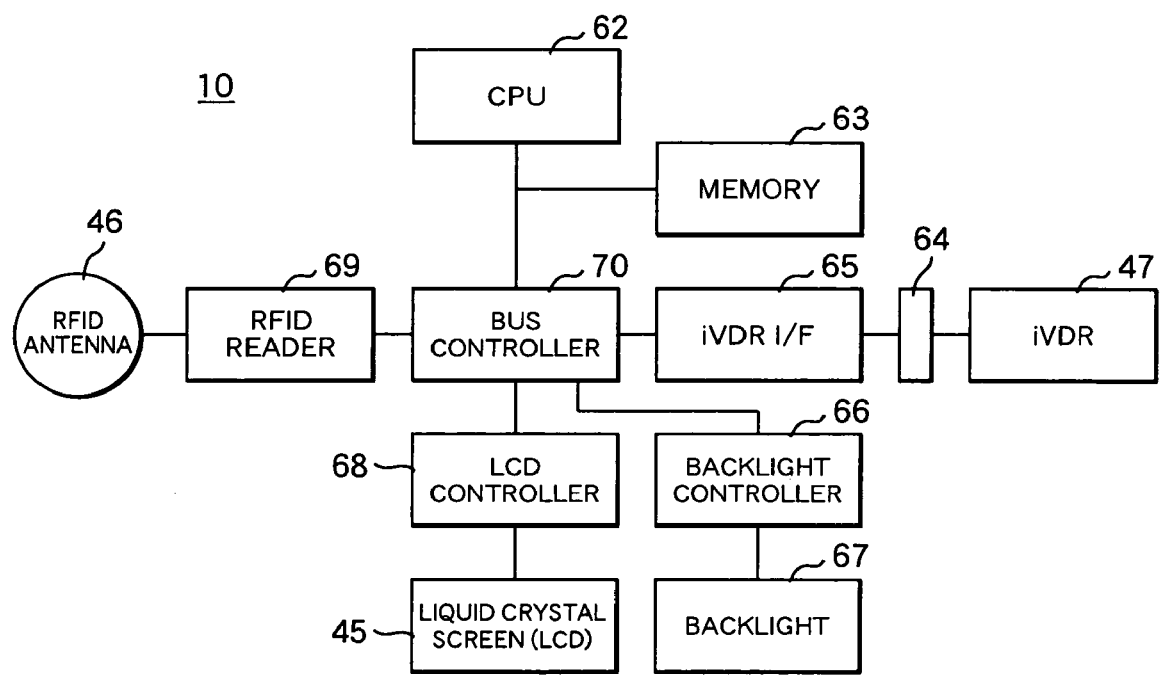
FIG. 6 is a functional block diagram showing the configuration of the control unit in the mobile type information terminal.

As shown in FIG. 6, the mobile type information terminal 50 has as the control unit, RFID reader 69, bus controller 70, CPU 62, memory 63, iVDR I/F 65, connector 64, LCD controller 68, backlight controller 66 and backlight 67. The RFID reader 69, CPU 62, memory 63, iVDR I/F 65, LCD controller 68, and backlight controller 66 are connected to the bus controller 70. The memory 63 is also connected to the CPU 62.

The foregoing iVDR 47 comprises a large capacity hard disk or the like and is connected to a removable bus controller 70 via the iVDR I/F 65.

The foregoing RFID antenna 46 is connected to the RFID reader 69.

The foregoing liquid crystal screen 45 is connected to the liquid crystal display controller 68, and illumination is done by the backlight 67 that is connected to the backlight controller 66. The control unit is a load on the power source in the mobile type information terminal 50.

Next, the flow of operations of the mobile type information terminal 50 of this invention will be described. A large number of mobile type information terminals 50 must be provided at one display site 61 (see FIG. 1), and this number is calculated based on the number of visitors per time period, average staying time, the holding time for all the visitors, the proportion of usage time to non-usage time by the visitors, power consumption of the mobile type information terminal 50, amount of power generated by the fuel cell unit 11, and in addition, a number of spare devices must be provided for when there is malfunctioning. For example, in a large exhibition site that can hold over 100 visitors simultaneously, an amount in the scale of hundreds must be provided.

Figure 9:
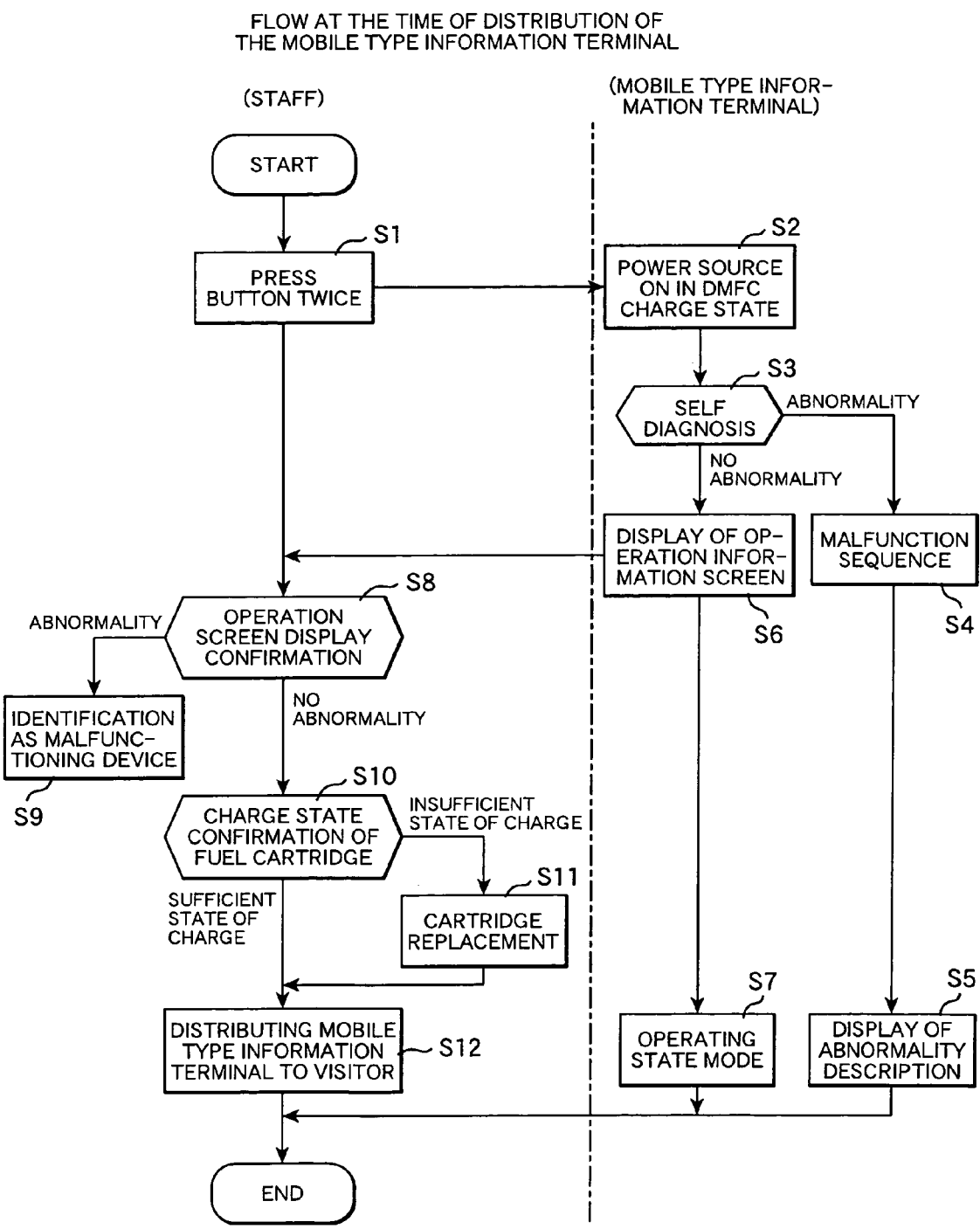
FIG. 9 is a flowchart showing the flow for distributing the mobile type information terminal to the visitor at the distribution window in the method for operating the mobile type information terminal.

FIG. 9 is a flowchart showing the flow for distributing the mobile type information terminal to the visitor at the distribution window in the operation method for the mobile type information terminal.

When the visitor enters from the entrance 59 of the exhibition site 61 in FIG. 1, a staff distributes a mobile type information terminal 50 to the visitor at the distribution window 55. When the battery capacity of the lithium ion battery 18a or the lithium ion battery 18b of mobile type information terminal 50 that the visitor borrowed is reduced due to use, the fuel cell unit 11 that is loaded inside as shown in FIG. 3 operates, and one of the lithium ion battery 18a or the lithium ion battery 18b whose battery capacity has reduced (or in other words, the charge side lithium ion battery) becomes charged. Therefore if the staff presses the button 44 (see FIG. 2) of the mobile type information terminal 50 to be distributed, twice (Step S1), the power source of the mobile type information terminal 50 is turned ON.

At this time, if the lithium ion battery 18a or the lithium ion battery 18b is to be charged by the fuel cell unit 11, the power source is turned ON due to the DMFC charge state (Step S2), the mobile type information terminal 50 immediately enters the self diagnosis mode and abnormality determination is performed (Step S3). If the results indicate that there is abnormality at the mobile type information terminal 50, the process transfers to the malfunction sequence (Step 4), and description of the abnormality is displayed on the liquid crystal screen 45 (see FIG. 2) of the mobile type information terminal 50 (Step S5). Examples of the description of the malfunction that is determined include "charging defects of the lithium ion battery 18a and the lithium ion battery 18b" or "generation state abnormality of the fuel cell unit 11". The description of the abnormality is written and recorded in the memory 63 or the iVDR 47 shown in FIG. 6.

If the results of the self diagnosis in Step 3 indicate that there is no abnormality at the mobile type information terminal 50, the initial operation information screen is automatically displayed at the liquid crystal screen 45 (see FIG. 2) of the mobile type information terminal 50 (Step 6). As a result, the mobile type information terminal 50 enters the operating state mode in which is the device operates (Step 7). At this time, the backlight 67 which illuminates the liquid crystal screen 45 is turned on for the first time by the backlight controller 67 (see FIG. 6). Thus, before handing the mobile type information terminal 50 to the visitor, the staff can confirm using the operation display of the liquid crystal display screen 45 (see FIG. 2) whether the mobile type information terminal 50 is in a normal state because the backlight 67 is ON (Step S8).

The operation description screen is not specifically shown in the flowchart of FIG. 9, but the following functions are realized as options. In other words, a distinction can be made between a visitor is an adult, or a non-Japanese, and by changing the way in which the pressing button 44 in FIG. 2 is pressed, and a suitable first screen for the visitor will be displayed. For example, when button 44 is pressed twice in the case of an adult visitor, text including kanji is displayed, while if button 43 is pressed twice in the case of a child, hiragana text is displayed and in the case of a non-Japanese visitor, if button 43 and button 44 are pressed one time each English text is displayed. By providing separate display texts, the visitor may select an appropriate display. This type of distinction may be stored as visitor information in the memory 63 or the iVDR 47 shown in FIG. 6. Of course dedicated buttons may be provided or pressing of the same button may obtain the same effects by various ways of pressing them. It is to be noted that even if the initial screen display is changed in this manner, the results of the self diagnosis is displayed in the same way.

Referring to FIG. 9 once again shows that the staff checks the state of the mobile type information terminal 50 using the operation screen display in Step S8, and if the display indicates that there is abnormality at the mobile type information terminal 50, the mobile type information terminal 50 is identified as a malfunctioning device and is not distributed to visitors (Step S9). On the other hand, if the display indicates that there is no abnormality at the mobile type information terminal 50, the staff checks the remaining amount of fuel in the fuel cartridge from the fuel level check window 40 of the mobile type information terminal 50 shown in FIG. 2 (Step S10). If the remaining amount of fuel is a prescribed amount, that mobile type information terminal 50 is distributed to a visitor (Step S12). On the other hand, if the remaining amount of fuel is less than the prescribed amount, the cartridge replacement port 48 (see FIG. 2) is opened and the fuel cartridge that is inside is taken out and replaced (Step S11), and then that mobile type information terminal 50 is distributed to a visitor (Step S12). It is to be noted that the cartridge replacement port 48 shown in FIG. 2 is preferably structured such that it can only be opened and closed using a special tool in order to prevent the visitor from unintentionally opening it.

As a result, when the visitor receives the mobile type information terminal 50 in which the operation screen is displayed, as shown in FIG. 1, the user will understand how to operate the device based on the display of the initial explanation, and then the visitor moves toward the exhibit 52a and appreciates the exhibit. The mount for the exhibit 52a has an RFID chip 51a installed therein, and thus based on the display of the exhibit 52a, the visitor moves the mobile type information terminal 50 towards the position of the RFID chip 51a or 51b. At this time, as shown in FIG. 3, the RFID antenna 46 of the mobile type information terminal 50 is disposed behind the liquid crystal screen 45, and thus the visitor may bring the RFID antenna 46 close to the RFID chip 51a or 51b without the need for unnatural postures. It is to be noted that when the exhibit 52a or 52b is a large panel or the like, the visitor brings the mobile type information terminal 50 close to structure such as a column-like access point which can be easily approached. The RFID chip 51a or 51b is installed in this structure which is close to the exhibit 52a rather than in the exhibit 52a itself.

Next, as shown in FIG. 1, the mobile type information terminal 50 receives signals from the RFID chip 51a or 51b via the RFID antenna 46 (FIG. 3) and the RFID reader 69 (see FIG. 6) reads information from the RFID chip 51a or 51b (FIG. 1) which received signals from the RFID antenna 46.

When this happens, the CPU 62 (see FIG. 6) accesses a prescribed address of the iVDR 47 via the iVDR interface 65 based on this information and the information stored in the iVDR 47 is opened in the memory 63. The information that has been opened in the memory 63 is displayed sequentially at the liquid crystal screen 45 of FIG. 2 via the LCD controller 68.

Thus, in FIG. 1, the visitor checks that information was directly transmitted from the exhibit 52a or 52b to the liquid crystal screen 45 of FIG. 2, and the texts and images pertaining to the exhibit 52a or 52b can be read. In this manner, the visitor proceeds according to the fixed route from exhibit 52a to 52b etc. and accesses the exhibits in which he/she is interested in the same manner. At this time, the iVDR 47 of the mobile type information terminal 50 (see FIG. 6) can record which exhibit the visitor accessed as well as the time of access. The information written in the iVDR 47 can be analyzed and used for visitor statistics. In addition, the iVDR 47 is taken out from the iVDR eject port 41 shown in FIG. 2 and the information may be entered and retrieved at an information device such as a personal computer. That is to say, as shown in FIG. 6, the iVDR 47 is away from the connector 64 and can be taken out. Examples of these methods for use include, removing the iVDR 47 and inserting it into an external server or a mounted device or for updating exhibit data of for obtaining and organizing data such as visitor information or malfunction information. It is to be noted that in the case where in addition to text and image, sound is used as information pertaining to exhibit 52a, a processing means for handling the sound signals is provided at the bus controller 70 in FIG. 6, and the sound signal read from the iVDR 47 can be played.

After going around the exhibition site 61, the visitor returns the mobile type information terminal 50 to the staff at the return window 56 in FIG. 1 and leaves from the exit 60.

Figure 10:
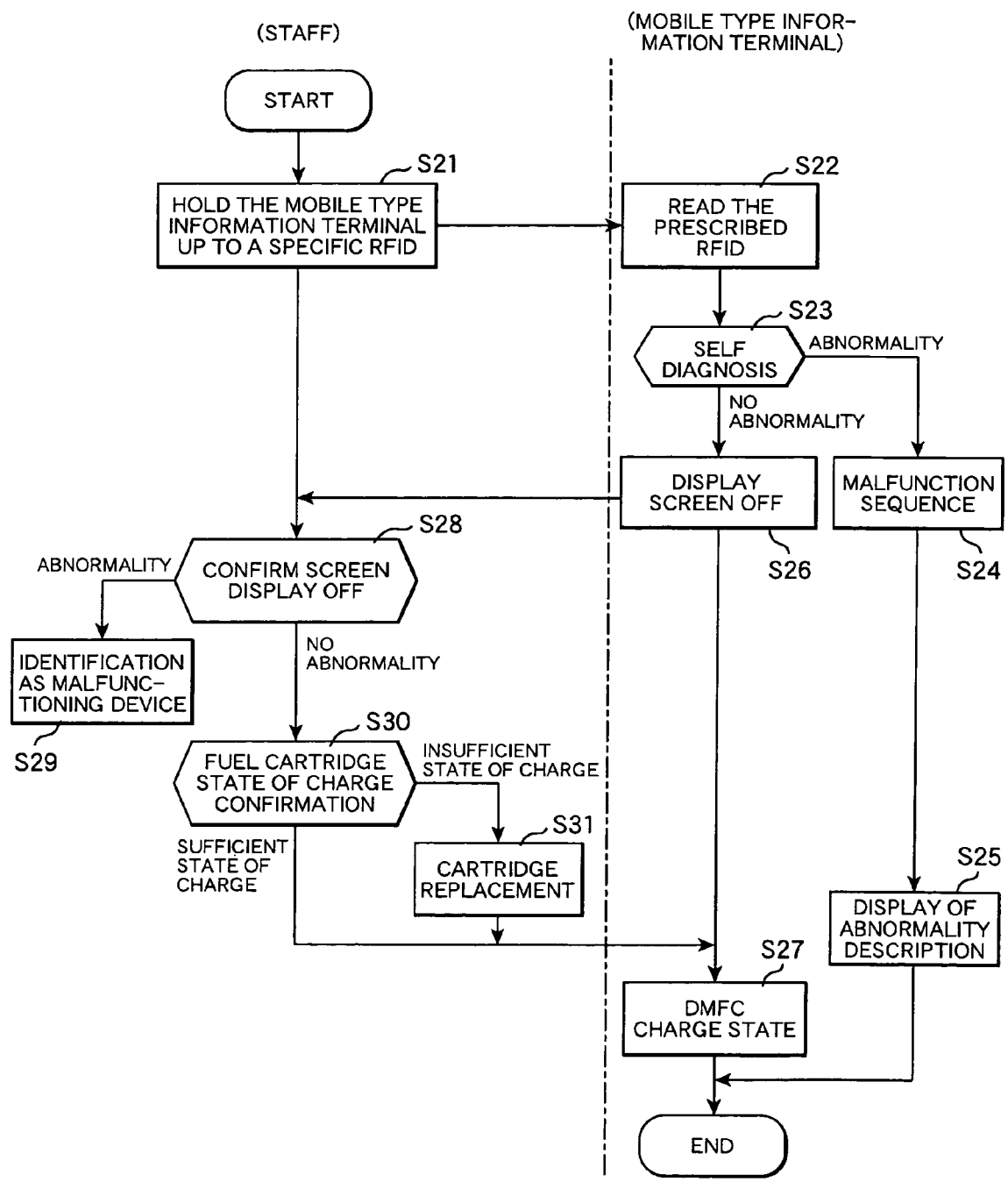
FIG. 10 is a flowchart showing the flow when the mobile type information terminal is returned by the visitor at the return window in the method for operating the mobile type information terminal shown in FIG. 1.

FIG. 10 is a flowchart showing the flow when the mobile type information terminal is returned by the visitor at the return window in the operation method of the mobile type information terminal 50 shown in FIG. 1.

When the mobile type information terminal 50 is returned, the staff holds up the mobile type information terminal 50 to the prescribed RFID chip 53 (FIG. 1) which is close at hand (Step S21). When the mobile type information terminal 50 reads the information from the RFID chip (Step S22), the mobile type information terminal 50 immediately goes into the self diagnosis mode (Step 23). If there is any abnormality at the mobile type information terminal 50, the operation transfers to the malfunction sequence (Step 24) and the description of the abnormality is displayed at the liquid crystal screen 45 (see FIG. 2) (Step 25). It is to be noted that the malfunction description that is handled here include "generation defects of the fuel cell unit 11" and "charge defects of the lithium ion battery 18a and the lithium ion battery 18b" which are the same as the case where the power source is ON.

On the other hand, in the case where there is no abnormality in the self diagnosis of Step 23, the backlight 67 (see FIG. 6) is turned OFF using the backlight controller 66, and the screen display of the liquid crystal 45 in FIG. 2 disappears (Step S26). As a result, the mobile type information terminal 50 goes into the standby mode and at the same time and also switches to the DMFC charge state of the standby mode (Step S27). Meanwhile, the staff checks whether the screen display has disappeared (Step S28), and in the case where the screen display has not disappeared, the mobile type information terminal 50 is identified as a malfunctioning device and is not to be distributed to visitors (Step S29).

Also, if it is confirmed that the screen display disappears in Step S28 (when OFF), because the state of the mobile type information terminal 50 is normal, the staff checks the remaining amount of fuel (see FIG. 2) in the fuel cartridge from the fuel level checking window 40 (Step 30). If the amount of fuel remaining in the fuel cartridge is normal, the mobile type information terminal 50 will be put on the cart 54 and conveyed to the distribution window 55. At this time, the state is that of the DMFC charging state in which the lithium ion battery 18a or the lithium ion battery 18b is charged by the power from the fuel cell unit 11 (Step S27). Meanwhile, in the case where checking the amount of fuel remaining in the fuel cartridge in Step 30 indicates that the fuel is less than the prescribed amount, the staff replaces the fuel cartridge (Step S31), and fuel battery unit 11 generates power using a new fuel cartridge and the DMFC charging state in which lithium ion battery 18a or the lithium ion battery 18b is charged by the fuel battery unit 11 is reached (Step 27).

In this manner, the returned mobile type information terminal 50 is held up to the RFID chip 53, and by reading prescribed information from the RFID chip 53, the mobile type information terminal 50 performs self diagnosis and then the power source automatically turns OFF, and so there is not concern that the power source is inadvertently left ON by the staff. Thus, power from the lithium ion battery 18a or the lithium ion battery 18b is never wasted and the mobile type information terminal 50 can be repeatedly used over a long period. It is to be noted that when the visitor returns the mobile type information terminal 50, the information from the RFID chip 53 maybe read by the mobile type information terminal 50 and then returned and the power source switch may be provided separate from the mobile type information terminal 50, and turned OFF by the staff. In addition, the mobile type information terminal 50 may automatically turn OFF if not operated over a prescribed period. Of course these features may be used together.

In FIG. 1, mobile type information terminal 50 in the standby state which the visitor has returned is in a DMFC charging state and then loaded on the cart 54 and conveyed to the distribution window 55, but rather than conveying the mobile type information terminal 50 by the cart 54, a conveying means such as a belt conveyor or a lift may be used to convey the mobile type information terminal 50. Also by providing the return window 56 and the distribution window 55 close to each other, the conveying means may be eliminated. In either of these cases, it is preferable that sequence management is performed such that when the mobile type information terminal 50 is to be distributed to a visitor next, they are distributed in the order in which they were returned.

The DMFC charging by the fuel cell unit 11 is set as follows. Namely, the power supply to the lithium ion battery 18a and the lithium ion battery 18b is sufficient and when the exhibition site is closed and the power remaining in the lithium ion battery 18a and the lithium ion battery 18b is extremely low, the lithium ion battery 18a and the lithium ion battery 18b are to fully charged using suitable power.

Figure 7:
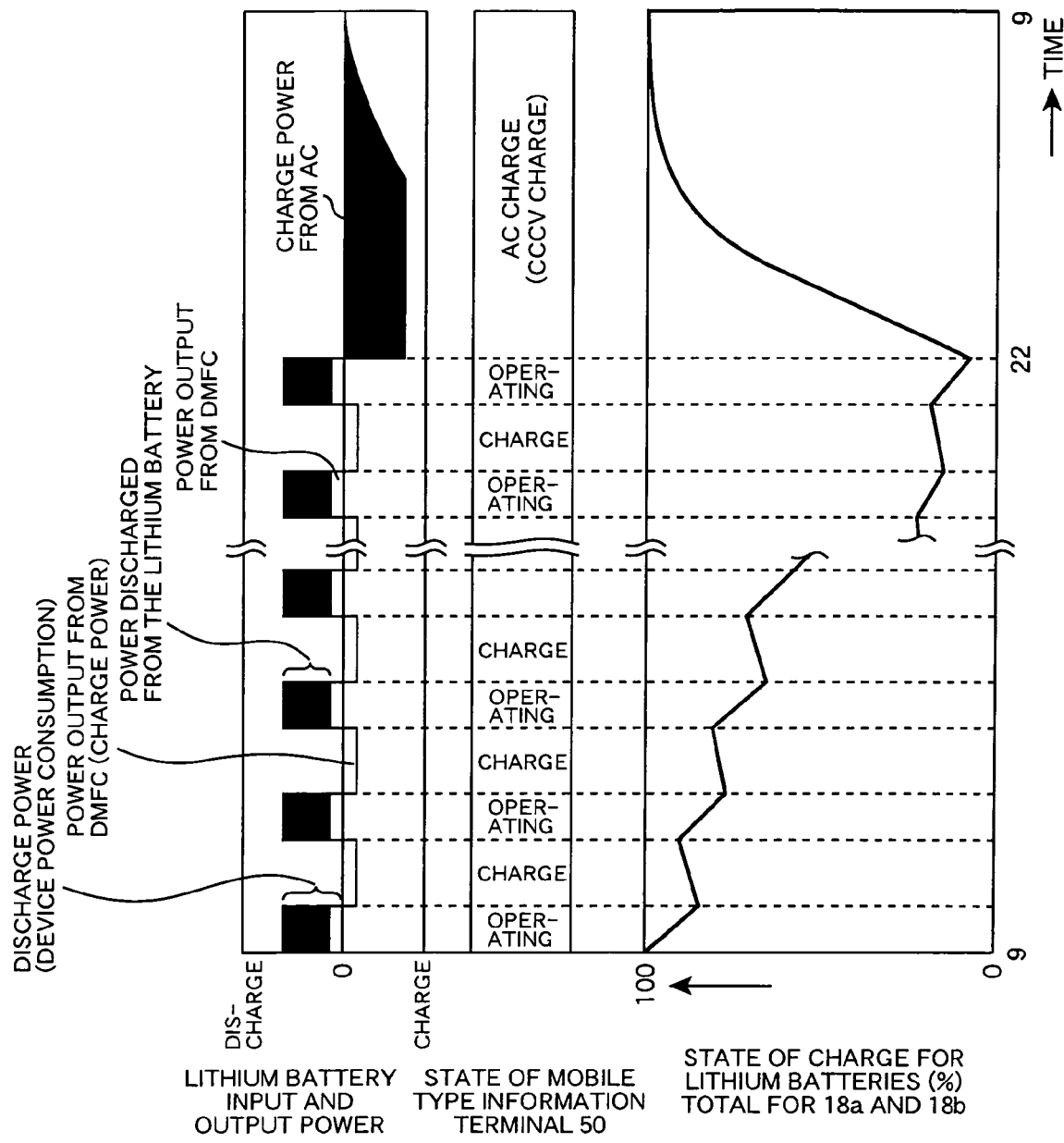
FIGS. 7a-c show the changes in the total value of the input and output power of the lithium ion batteries loaded in the mobile type information terminal of this invention and the lithium ion state of charge.

FIGS. 7a-c show the changes in the total value of the input and output power of the lithium ion battery loaded in the mobile type information terminal of this invention and the lithium ion state of charge.

In FIGS. 7a-c, the horizontal axis shows the passage of time while the vertical axis shows the input and power of all the lithium ion batteries (lithium ion battery 18a or the lithium ion battery 18b combined) of one mobile type information terminal 50 in one set of operations described above and the changes in the total state of charge for all the lithium ion batteries. The balance of the input and output power of all the lithium ion batteries is in a charge release state at the time of operation of the mobile type information terminal 50 or in other words when a visitor uses the mobile type information terminal 50 at the exhibition site, and the charge state occurs when the mobile type information terminal 50 is charged by the AC charging device (charging rack) 58 which is installed in the backyard, when the site is closed. When the mobile type information terminal 50 is being operated, the fuel cell unit 11 is always in a charge generating state, and thus some of the burden for discharge power (power consumed by the device) of the mobile type information terminal 50 is transferred from the fuel cell unit 11 and the burden for the remaining amount is calculated to be from the remaining lithium ion battery. In this manner, as shown in FIG. 7a, the charge release power of all of the lithium ion batteries is set so as to exceed the DMFC or in other words the output power of the DMFC using the fuel cell unit 11. As a result, the total value for the state of charge of the lithium ion battery 18a or the lithium ion battery 18b moves in the downward direction as is the case for the state of charge graph for all the lithium ion batteries shown in FIG. 7(c) due to operation of the mobile type information terminal 50 and repeated charging as shown in FIG. 7(b).

If it is assumed that the for the exhibition site opens at 9 a.m., the total state of full charge of the lithium ion battery 18a or the lithium ion battery 18b is gradually reduced due to repetitive operation and charging based on the rate with which the visitors leave and enter, and at the closing time of 10 p.m., the state of charge is very low. For example, given that for a DMFC charge power of 0.8 w and the load of the mobile type information terminal 50 is 2.5 w-3.5 w, at 10 p.m., after operation during approximately 13 hours of open time, total state of charge of the lithium ion battery 18a or the lithium ion battery 18b is less than 20% as shown in FIG. 7(c). After the exhibition site closes at 10 p.m., all of the mobile type information terminals 50 are stored on the backyard charging rack 58 shown in FIG. 1, and CCCV (constant current, constant voltage) charging is done from the AC power source (commercial power source). At this time, the total state of charge of the lithium ion battery 18a or the lithium ion battery 18b increases as the charging time increase and are all fully charged prior to opening time on the following day.

Next, the operation of the charge circuits for the fuel cell unit 11 and the lithium ion battery 18a and the lithium ion battery 18b will be described.

FIG. 4 shows the power source circuit system for the mobile type information terminal of this invention.

In this embodiment, the lithium ion battery 18a and the lithium ion battery 18b represent the lithium ion battery, but these secondary batteries are not limited to a lithium ion battery and other secondary batteries such as a nickel hydride battery or a nickel-cadmium battery may be used. Also, as shown in FIG. 4, the lithium ion battery 18a and the lithium ion battery 18b are respectively connected to the voltage monitoring circuit 19a and the voltage monitoring circuit 19b, and the input and output circuits of the lithium ion battery 18a and the lithium ion battery 18b respectively have the current integrating circuit 20a and the current integrating circuit 20b connected thereto. The output information from the current integrating circuit 20a and the current integrating circuit 20b is sent to the power source management circuit 21.

The charge control circuit 7a and the charge control circuit 7b are connected to the input side for the lithium ion battery 18a and the lithium ion battery 18b respectively, and the charge current and the charge voltage are controlled. Furthermore, the discharge switches 8a, 8b and 8c are connected to the output side of the AC adapter 2, the lithium ion battery 18a and the lithium ion battery 18b respectively, and by switching these charge switches 8a, 8b and 8c, the power source which supplies to the DC/DC converter 9 is selected. It is suitable to use power MOSFETs which have comparatively small ON resistance as the discharge switches 8a, 8b and 8c, but other means such as relays or the like may be used. In addition, the output from the DC/DC converter 9 is supplied to load 10. It is to be noted that load comprises parts such as those shown in FIG. 6.

The main body unit 6 comprises the lithium ion battery 18a and the lithium ion battery 18b and the aforementioned circuits for control thereof. The main body unit 6 comprises a connector 3 for connecting the adapter 2 when charging is done during the night and a connector 16 for connecting the fuel cell unit 11. It is to be noted that the AC adapter 2 is stored in the charging rack 58 shown in FIG. 1.

In addition to the DMFC 12, the inside of the fuel cell unit 11 also has an open circuit voltage protective circuit 14 that is connected to the DMFC 12 via the connector 13. The connector 13 is for protecting the DMFC 12 main body or to facilitate insertion and removal of the wires between the DMFC 12 and the open circuit voltage protective circuit 14 when the DMFC 12 is being replaced. The open circuit voltage protective circuit 14 is for preventing damage of the next boost DC/DC converter 15 or the main body unit 6 due to the high voltage OCV (open circuit voltage) generated when the DMFC 12 generates power in a no-load state. In addition, the boost DC/DC converter 15 has the role of boosting and stabilizing the DMFC 12 output voltage. The number of serial cells in the DMFC 12 in the first embodiment is six cells and the output voltage of the boost DC/DC converter 15 is approximately 4.5V-5.0V.

Next, the operation of the power source circuit system of the mobile type information terminal 50 shown in FIG. 4 is described with reference to the state of charge graph for each lithium ion battery cell shown in FIG. 8.

Figure 8:
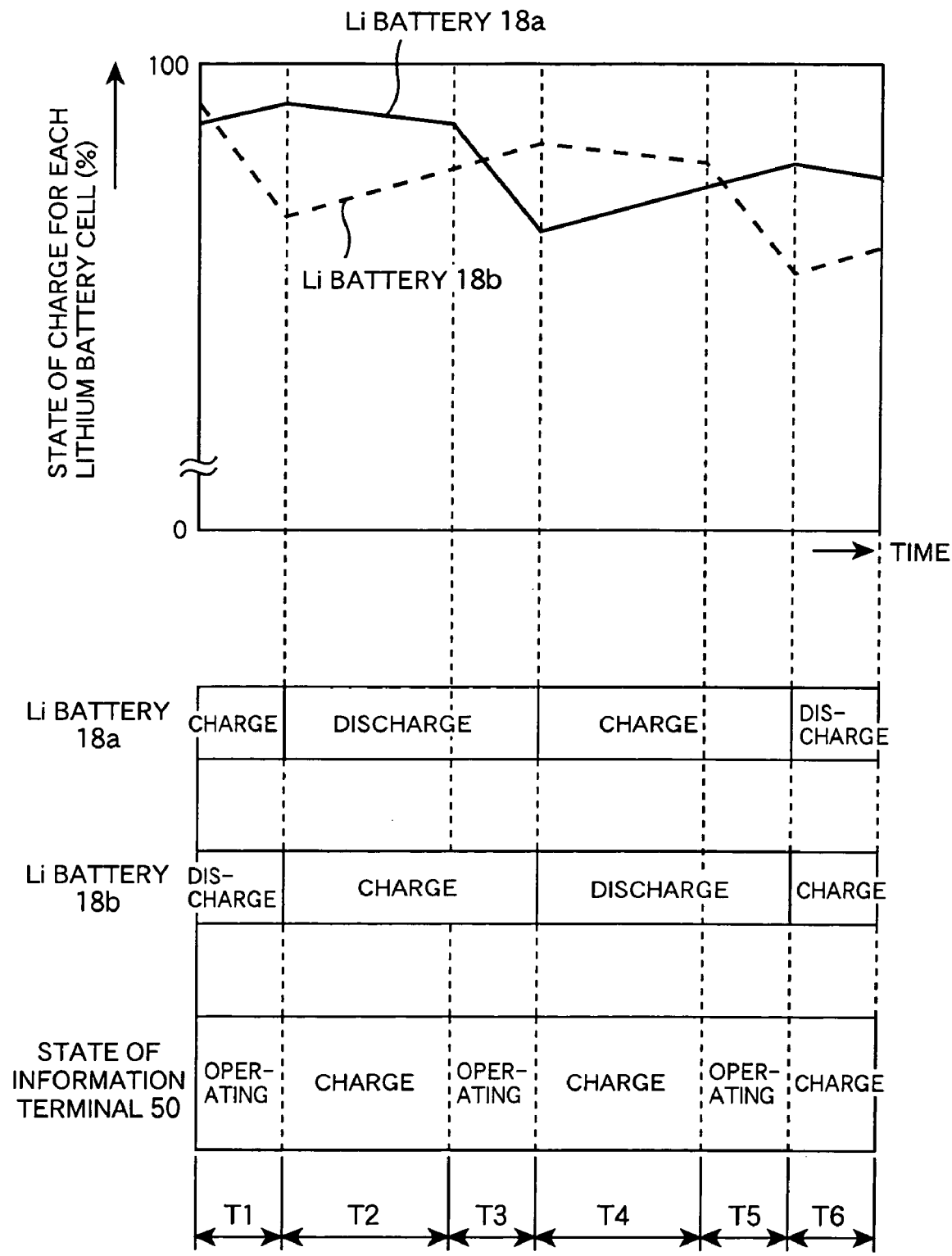
FIG. 8 shows the relationship between the state of the mobile type information terminal and the charging and discharging of the two sets of lithium ion batteries.

FIG. 8 shows the relationship between the state of the mobile type information terminal and the charging and discharging of the two sets of lithium ion batteries. FIG. 7a-c show the movement of the total state of charge of the lithium ion battery 18a and the lithium ion battery 18b, but FIG. 8 shows the movement of the state of charge of the lithium ion battery 18a and the lithium ion battery 18b respectively. This is because there are two cells (two sets) which independently charge and discharge the lithium ion battery 18a and the lithium ion battery 18b respectively.

In FIG. 8, when the mobile type information terminal 50 at time T1 is distributed and in the operating state, if the lithium ion battery 18a is connected to load 10 and is in the discharge state, the lithium ion battery 18a receives charge from the DMFC 12 and achieves a DMFC charge state. Thus, with the passage of time, the state of charge of the lithium ion battery 18b us reduced and the state of charge of the lithium ion battery 18a increases.

In addition, at the start of time T2 when the mobile type information terminal 50 is returned and information is read from the specific RFID chip 53, the lithium ion battery 18b is in the DMFC charge state and the lithium ion battery 18a switches to the charge and discharge system when connected to the load 10. The charge state of the backyard of the lithium ion battery 18b at time T2 will be described next. In this state, the connector 3 (see FIG. 4) is not connected to the AC adapter 2 and the fuel cell unit 11 is connected to the connector 16. Also, the state control signal 17 from the voltage monitoring circuit 4 is ON because the AC adapter 2 is not connected and in addition, the boost DC/DC converter 15 of the fuel cell unit 11 is in the operating state. Furthermore, because the charge control circuit 7b is ON and the charge control circuit is OFF, the power of the fuel cell unit 11 that is supplied via the connector 16 charges the lithium ion battery 18b via the charge control circuit 7b.

At this time, the charge current and time for the lithium ion battery 18b is measured precisely using the current integrating circuit 20b, and the power source management circuit 21 calculates the remaining charge of the lithium ion battery 18b based on this information. Furthermore, the integration value of the charge current for the lithium ion battery 18b is considered the power generated by the DMFC 12 and the measured amount is measured every set time and recorded along with the date and time in the memory 63 or the iVDR 47 (see FIG. 6). In addition, the power source control circuit 21 compares the current measured amount of generated power with the previous amount of generated power. If the current measured amount of generated power is less than a prescribed amount which is set as a low value with respect to the fixed value, a determination is made that the DMFC 12 has deteriorated.

On the other hand, in this state (namely the charge state for the lithium ion battery 18b at time T2), the discharge switch 8b is ON and the lithium ion battery 18a is connected to the DC/DC converter 9 via the discharge switch 8a. Thus, the load of the lithium ion battery 18a is discharged at the path of the discharge switch 8b for the load 10. At this time, the output current for the lithium ion battery 18a is detected by the current integrating circuit 20a and managed by the power source management circuit 21. Consequently, as shown at time T2 in FIG. 8, the remaining charge in the lithium ion battery 18b is increased by DMFC charging, and the remaining charge in the lithium ion battery 18a is reduced. It is to be noted that in the DMFC charge state in the backyard, because there is little or no power consumption, the reduction in the remaining charge of the lithium ion battery 18a is very little. However, the mobile type information terminal 50 is distributed to the visitor at the start of the time T3, during the operation time T3 after the power source is turned ON, because there is an increase in power consumption, the level of reduction in the remaining amount of charge of the lithium ion battery 18a becomes large. It is to be noted that at time T3 in the operating state, DMFC charging of the lithium ion battery 18b is the same as that at time T2 and thus the charge curve for lithium ion battery 18b is an extension from time T2.

Next, at the return window 56, the mobile type information terminal 50 reads the information from the RFID chip 53 at the start of time T4 and the state of the lithium ion battery 18a and the lithium ion battery 18b is thereby switched at the time of transfer from the operating state to the standby state. That is to say, at time T4 in the standby state, the lithium ion battery 18a is in the DMFC charge state, and the lithium ion battery 18b is in the state of being connected to the load, and the mobile type information terminal 50 moves to the backyard. At this time, the state of the lithium ion battery 18a and the lithium ion battery 18b is determined by the power source management circuit 21, and the charge control circuit 7b is first turned OFF and the discharge switch 8c is turned ON, and a discharge route from the lithium ion battery 18b to the DC/DC converter 9 is secured. The discharge switch 8b is then turned OFF and the discharge route from the lithium ion battery 18b is cut off and at the same time operation of the discharge control circuit come ON.

At this time, the because the AC adapter 2 is not connected, the state control signal 17 is ON, and the power from the fuel cell unit 11 charges the lithium ion battery 18a via the boost DC/DC converter 15 and the charge control circuit 7a. As a result, as shown at time T4 in FIG. 8, the remaining capacity of the lithium ion battery 18a is increased, and the remaining capacity of the lithium ion battery 18b is reduced. At this time, because there is very little power consumption in the backyard at time T4, the reduction in the remaining charge of the lithium ion battery 18b is small, but at the time of operation during the time T5 after the mobile type information terminal 50 is distributed to the visitor, because the power consumption increases, the level of reduction in the remaining capacity of the lithium ion battery 18b increases. At T6, as is the case at time T2, the mobile type information terminal 50 is returned and the state of charge or discharge is switched for the lithium ion battery 18a and the lithium ion battery 18b, and in the backyard the lithium ion battery 18b attains the DMFC charge state and the lithium ion battery 18a is connected to the load.

In this manner, at each time the mobile type information terminal 50 is returned which represents the timing for transfer from the operating state to the standby state in normal operation, the charge and discharge state of the lithium ion battery 18a and the lithium ion battery 18b are switched. Thus, as shown in the graph in FIG. 8, the change trend for the state of charge for the 2 sets of lithium ion batteries is downwards overall. It is to be noted that the timing for the switching of the lithium ion batteries is done every fixed period based on fixed time elapsed using a timer, and the switching may also be done using the timing of a separate event such as when the visitor holds up the mobile type information terminal 50 toward a prescribed RFID chip at the site, and reads the information on the IC chip. It is to be noted that when the switching is performed using the SOC determination which has a state of charge management function, the lithium ion battery with the lower state of charge is always switched to the DMFC charge state. As a result, in the embodiment shown in FIG. 8, the lithium ion battery 18a and the lithium ion battery 18b alternately repeats the charging and discharging, and the lithium ion battery which is almost in the fully charged state never switches to the DMFC charge state, and thus depending on the situation, one of the lithium ion batteries continues to be charged or is in usable form which discharges.

That is to say, for the lithium ion battery 18a and the lithium ion battery 18b, because the charge state and the discharge state are always clearly distinguished, state of charge management is simple, and the effective use of the entire battery capacity of the combined lithium ion batteries is realized. In addition, the lithium ion battery itself can be safely used without any problems with respect the method of use. Furthermore, because there is no direct power bus from the DMFC 12 to the load 10, the state of the DMFC 12 never directly affects the load 10 and thus the mobile type information terminal 50 can be stably operated.

Next, during the night or on when the exhibition is closed and the mobile type information terminal 50 is not being used, as shown in FIG. 1, the mobile type information terminal 50 is stored in the charging rack 58, and as shown in FIG. 4, and the AC charging operation is performed using the commercial power source 1. At this time, the AC adapter 2 is connected to the commercial power source 1, and connected to the mobile type information terminal 50 via the connector 3. In addition, the input voltage is checked using the voltage monitoring circuit 4 in the mobile type information terminal 50 and the state control signal 17 is turned OFF. As a result, the boost DC/DC converter 15 is stopped and the power from the DMFC 12 is no longer input to the main body unit 6. In this state, the charge control circuit 7a and the charge control circuit 7b come ON and the discharge switch 8a comes ON and the discharge switches 8b and 8c go OFF.

Thus the power input from the AC adapter 2 is input to the charge control circuit 7a and the charge control 7b via the diode 5 and charges the lithium ion battery 18a and the lithium ion battery 18b respectively. Furthermore, the power input from the AC adapter 2 is supplied to the load 10 via the discharge switch 8a and the DC/DC converter 9. It is to be noted that the load 10 is in a sleep state at this point and the power input from the AC adapter 2 mainly charges the lithium ion battery 18a and the lithium ion battery 18b. That is to say, if the mobile type information terminal 50 is inserted into the connector 3 that is provided in the charging rack 58 and AC charging is started, the backlight 67 in FIG. 6 is automatically turned OFF and the transfer to the charge mode is performed. This eliminates the concern that the power source may inadvertently not turned OFF causing a waste in energy, and this improves convenience for the staff who handle a large number of mobile type information terminals.

Also, in FIG. 4, when the mobile type information terminal 50 is unplugged from the connector 3 of the AC adapter 2, the power source comes ON and the mobile type information terminal 50 automatically goes into self diagnosis mode, and the charge state of the lithium ion battery 18a and the lithium ion battery 18b is checked. If there is no abnormality, the backlight 67 (see FIG. 6) is turned OFF and the mobile type information terminal 50 waits for starting of the DMFC 12. Because the state of the lithium batteries is viewed and charging is suitably performed for dedicated charge control circuit 7a and the charge control circuit 7b for lithium ion battery 18a and the lithium ion battery 18b, battery management is facilitated and there is no deterioration and concern about overcharging. In addition, even if both of the lithium ion battery 18a and the lithium ion battery 18b are completely discharged, it is possible for power to be supplied from the AC adapter 2, and in this state maintenance of the main body can be performed at any time.

Figure 13:
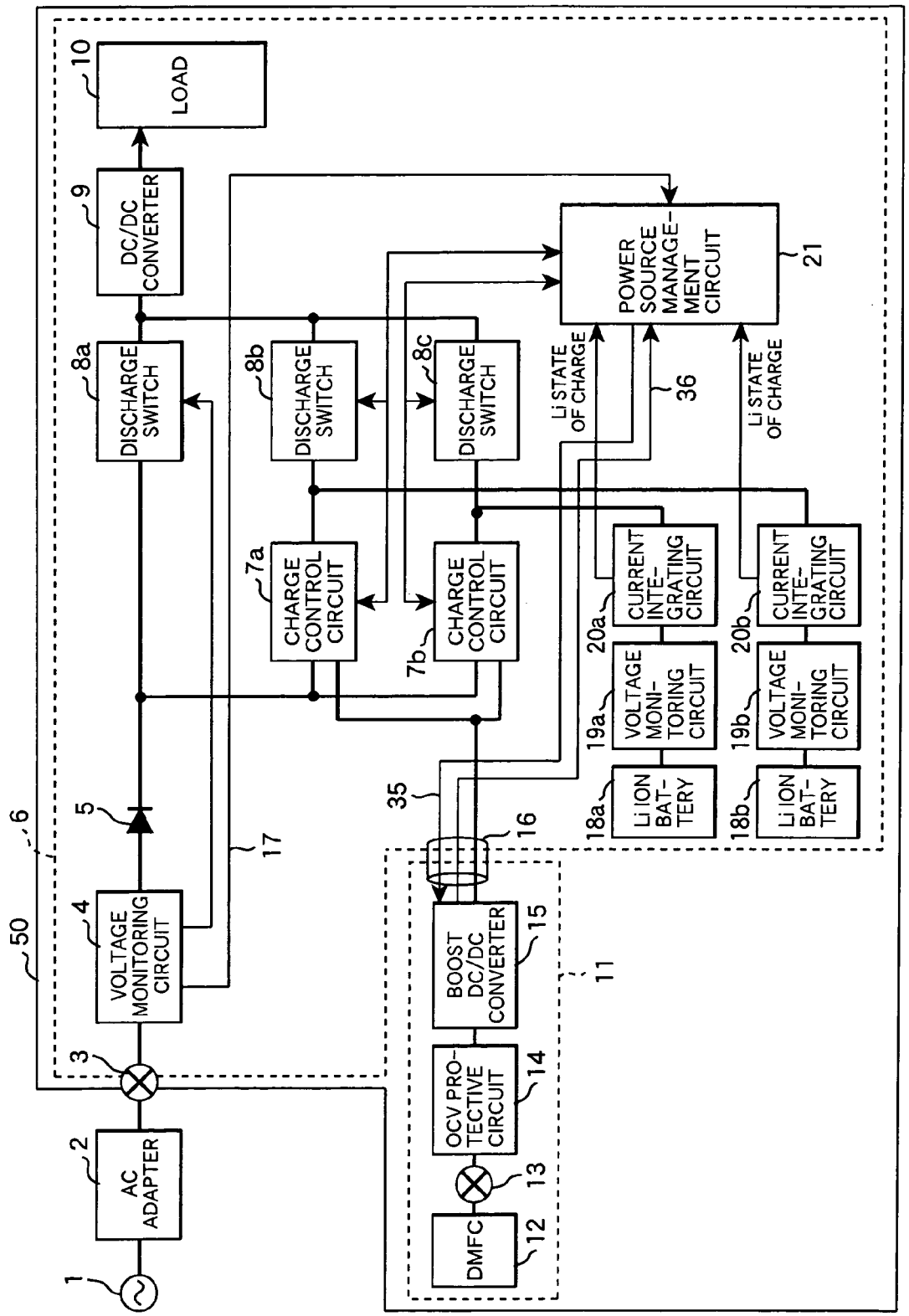
FIG. 13 shows a modified exampled of the power circuit system of FIG. 4.

FIG. 13 shows a modified exampled of the power circuit system of FIG. 4, and is formed of the same parts having the same number assigned as in the power circuit system of FIG. 4, except where specifically described.

In FIG. 13, the wires from the connector 16 and the wires from the AC adapter 2 to the charge control circuits 7a and 7b respectively are provided separately. In addition, in this embodiment, the charge control circuits 7a and 7b compare the voltage from the connecter (or the output voltage from the boost DC/DC 15) and the voltage from the AC adapter 2, and the higher voltage input is used.

For example by setting the AC adapter 2 to 5.5V and the boost DC/DC 15 output to 4.5 V, even if the forward direction reduced voltage of 0.7V of the diode 5 is used, when connected to the commercial power source, the voltage from the AC adapter 2 normally becomes higher than the voltage from the connector 16 and thus the power from the AC adapter 2 is automatically employed. As a result, the burden of control on the power source management circuit 21 is reduced.

In addition, signals indicating the switching state of the charge control circuits 7a and 7b and the discharge switches 8b and 8c are transmitted to and from the power source management circuit 21. As a result, it becomes possible for the power source management circuit 21 to check the power source state of the mobile type information terminal 50.

It is to be noted that the charge control circuits 7a and 7b and the discharge switches 8b and 8c are each shown as a separate block circuit, but the charge control circuit 7a and the discharge switch 8b as well as the charge control circuit 7b and the discharge switch 8c may each be configured as one integrated circuit.

FIG. 5 is a circuit map showing the details of the circuit comprising inner part of the fuel cell unit from among the circuit configurations of the power source control system shown in FIG. 4.

In FIG. 5, the thermistor 34 is connected to the DMFC 12, and the temperature information detected by the thermistor 34 is input to the boost converter control circuit 30. The DMFC 12 is connected to the OCV protective circuit 14 via the connector 13. The OCV protective circuit 14 comprises a shunt regulator 22 and a bridge circuit comprising resistors 23, 24 and 25. The OCV protective circuit 14 is also connected to the boost DC/DC converter 15. The boost DC/DC converter 15 comprises an n-channel power MOSFET 28, a p-channel power MOSFET 29, an inductor 27, an smoothing capacitor 33, a boost converter control circuit 30, a current sensor 26, an input current control circuit 31 and output voltage control circuit 32. It is to be noted that the boost DC/DC converter 15 is connected to the main body unit 6 shown in FIG. 6 via the connector 16.

Next, the operation of the fuel cell unit 11 shown in FIG. 5 will be described. The output voltage for the DMFC 12 is compared with the reference value of the shunt regulator 22 which is the partial pressure of the resistor 24 and the resistor 25. Thus, in the case where the output voltage of the DMFC 12 is less than a prescribed value, the invertance of the shunt regulator 22 becomes extremely high and current does not flow to the resistor 23. However, if the open circuit voltage (OCV) of the DMFC 12 is less than a prescribed amount, the invertance of the shunt regulator 22 rapidly becomes low and current flows to the resistor 23.

The current-voltage characteristics of the DMFC 12 has a high open circuit voltage when the current is zero but if at least some current flows, the voltage is greatly reduced. For this reason, the output voltage of the DMFC 12 can be kept below a prescribed value regardless of the state of the main body unit 6 in FIG. 4, due to the circuit configuration of the OCV protective circuit 14. Damage of the boost DC/DC converter 15 and the main body unit 6 due to the increase in the open voltage is prevented.

Next, the control method for the boost DC/DC converter 15 shown in FIG. 5 will be described. The boost DC/DC converter 15 alternately switches the n-channel power MOSFET 28 and the p-channel power MOSFET 29 using the boost converter circuit 30. As a result, when the n-channel power MOSFET 28 is ON, the energy collected in the inductor 27 is transferred to the even capacitor 33 when the p-channel power MOSFET 29 is ON and thus the output voltage is increased by the boost DC/DC converter 15.

In the first embodiment, the output voltage of the boost DC/DC converter 15 is set to 4.5V-5.0V. This boost DC/DC converter 15 feeds back the voltage from the even capacitor 33 to the output voltage control circuit 32, and the output voltage is controlled to be constant in the range from 4.5V to 5.0V. Furthermore, the current that flows to the inductor 27 is detected by the current sensor 26 and input to the input current control circuit 31. If the input current control circuit 31 is less than a preset current value (ILim), there is no output signal, and the boost control circuit 30 is operated using only the output signal from the output voltage control circuit 32, and the ON/OFF ratio of the each gate circuit for the n-channel power MOSFET 28 and the p-channel power MOSFET 29 is controlled.

However, if the detected current from the current sensor 26 exceeds the set current value (ILim), the output signal from the input current control circuit 31 changes and thus at the boost control circuit 30, the output signal from the input current control circuit 31 for the output signal of the output voltage control circuit 32 is preferentially input and the input current ILim is controlled so as to be limited to a constant value. As a result, the DMFC output current is controlled to be less than a prescribed value, and various phenomena such as output reduction due to air bubbles in the DMFC, condensation at the air limit due to increase in the accompanying water, and water leakage are prevented. Thus the mobile type information terminal 50 can be stably used for a long time.

It is to be noted that because the charge control system shown in FIG. 5 controls the current from the DMFC 12 using the input current control circuit 31, in the circuit configuration which is simply DMFC 12—boost DC/DC converter 15—load 10, stable operation is not possible because the changes in the load 10 of the main body unit 6 cannot be followed. However, in the charge control system of the first embodiment, as shown in FIG. 4, the direct load of the DMFC 12 is always at the lithium ion batteries, and because the load 10 is connected to the other lithium ion batteries, the output current limit of the DMFC 12 does not affect the load 10.

Next, the temperature protection function will be described. The DMFC 12 is always stably operating at the operation point because the above-described current control function is provided. However, as shown in FIG. 5, because the thermistor 34 is connected to the DMFC 12 and the temperature is detected, in the unlikely event that the DMFC 12 overheats and the temperature increases above the prescribed temperature, temperature information is input to the boost converter control circuit 30 and switching of the boost DC/DC converter 15 is stopped and the converter operation is caused to shut down. It is to be noted that because the temperature protection function has temperature hysteresis, when the DMFC 12 is sufficiently cooled due to stopping of the converter operation, the device automatically restarts.

In the first embodiment, the p-channel power MOSFET 29, the shottky barrier diode may be realized by the p-channel power MOSFET 29, and due to the configuration of the boost converter control circuit 30, the n-channel power MOSFET 28 may also use the shottky barrier diode. Of course, the n-channel power MOSFET 28 and the p-channel power MOSFET 29 may be replaced by other power semiconductor devices. In addition, the shunt regulator 22 may comprise a general comparator and a standard power source. Furthermore, the current sensor 26 may be realized by various current detection means such as one using a sensor MOSFET for detection which has built therein, a shunt resistor, a hole element, or an n-channel power MOSFET 28 and the like. In addition, the position for insertion of the current sensor 26 may be at the input side of the inductor 27, or at the ground side or in other words, inserted between the source electrode for the n-channel power MOSFET 28 and the ground side of the resistor 25.

In addition, the boost DC/DC converter 15 is connected to the rear of the OCV protective circuit 14, but the output terminal of the DMFC 12 is directly connected to the boost DC/DC converter 15, and even if OCV protection circuits are serially connected to the connection point, the circuit configuration is the same. In addition, even when the DMFC 12 overheats, the DMFC 12 is operated in the same manner as the input current control circuit 31 and the output voltage of the boost DC/DC converter 15 is restricted. It is to be noted that the iVDR 47 (see FIG. 6) in first embodiment does not need to be a hard disk and other recording media such as an optical disk may be used.

Figure 11:
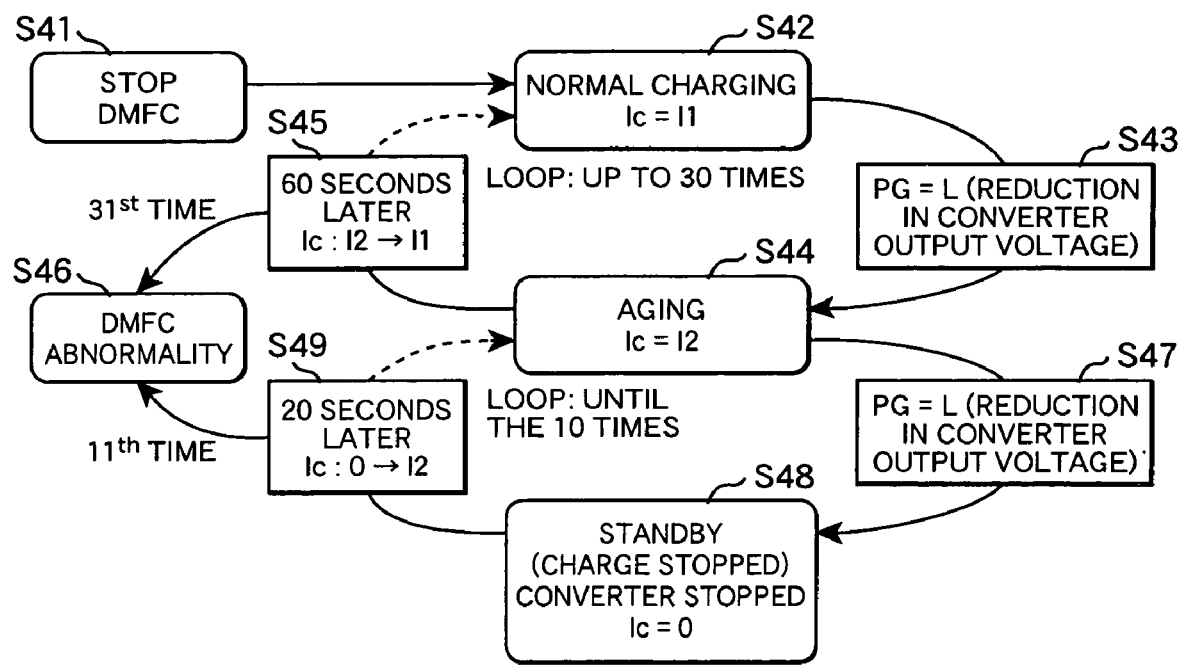
FIG. 11 shows the outline of the steps relating to state determination and retrial of generation for the DMFC relating to the mobile type information terminal of the second embodiment of this invention.

Next, the self diagnosis method of the mobile type information terminal of the second embodiment of this invention will be described using FIG. 1, FIG. 4, FIG. 5, FIG. 11 and FIG. 12. FIG. 11 shows the outline of the steps relating to state determination and retrial of generation for the DMFC relating to the mobile type information terminal of the second embodiment.

First the state determination and retrial of generation for the DMFC in the power source system of mobile type information terminal is described using FIG. 11.

As shown in the steps in FIG. 11, from the stop state of the DMFC 12 (Step S41), one of the lithium ion battery 18a or the lithium ion battery 18b goes into a normal charge state in which it is charged by the DMFC 12. At this time, the lithium ion battery 18a or the lithium ion battery 18b is charged by the fixed value I1 of the charge current command value Ic (Step S42). Here the PG signal from the DMFC 12 becomes L, or in other words, when the output value of the boost DC/DC converter 15 decreases (Step S43), charge current command value Ic to the lithium ion battery 18a and the lithium ion battery 18b changes to the fixed value I2 which is smaller than the fixed value I1 and aging mode charge continues (Step 44). In addition, after charging in the aging mode is continued for 60 seconds, the charge current command value Ic is returned to again to the fixed value I1 (Step S45), and then a transfer is made to normal charging (Step S42). This operation is repeated 30 times and the 31th operation is processed as a DMFC abnormality (Step S46).

In the charging state of the aging mode of Step S44, when the PG signal from the DMFC 12, or in other words, if the output voltage of the boost DC/DC converter reduces (Step S47), the boost DC/DC converter 15 is stopped, charging is stopped and the process enter the standby state. Of course, at this time the charge current command value Ic to the lithium ion battery 18a or the lithium ion battery 18b is zero (Step S48). In addition, after 20 seconds have elapsed in the standby state, the charge current command value Ic returns to the small fixed value I2 from zero (Step S49) and a transfer is made to the aging mode (Step S44). This cycle is repeated 10 times and the 11th cycle is processed as a DMFC abnormality (Step S46).

These transitions in the steps occur when the mobile type information terminal 50 is being used by the visitor as well as when it is not being used. At this time, because stable power is always being supplied from the lithium ion battery 18a or the lithium ion battery 18b to the load system of the mobile type information terminal 50, the transitions in the steps are not affected at all. In addition, even in the case where a transfer is made to the DMFC abnormal state, no abnormality is indicated at the mobile type information terminal 50, and as described before, and the DMFC 12 abnormality is recorded along with the date and time in the memory 63 or the iVDR 47 (see FIG. 6). In addition, in FIG. 1, during the self diagnosis mode when the power source is ON at the distribution window 55 or when the power source is OFF at the return window 56, abnormality is displayed for the first time. As a result, trouble with the power source system never occurs while the visitor is using the mobile type information terminal 50.

Next, state determination and retrial of generation in the power source system in the DMFC 12 of the mobile type information terminal will be described in detail using FIG. 12.

Figure 12:
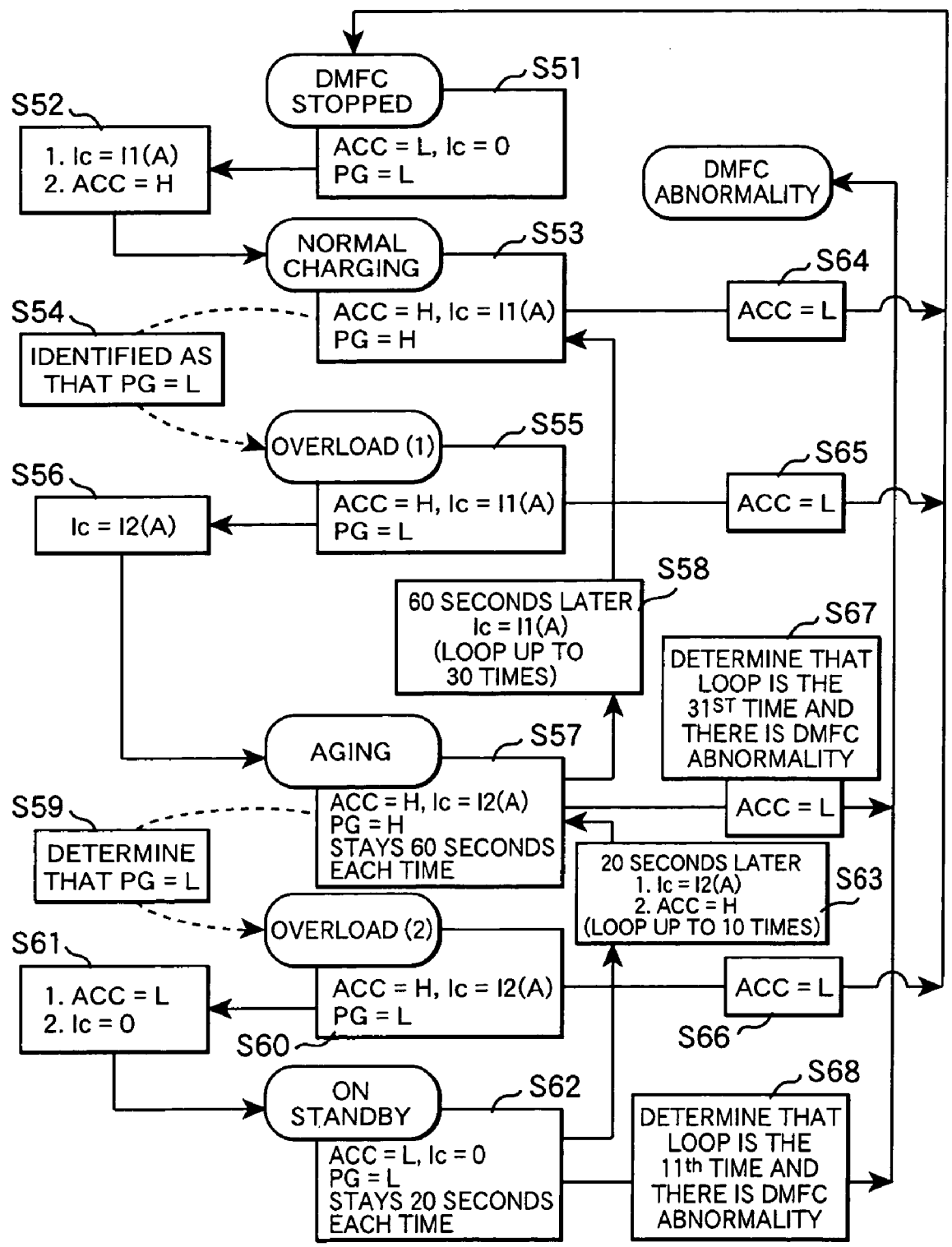
FIG. 12 shows the details of the steps shown in FIG. 11.

FIG. 12 shows the details of the steps relating to the state determination of the DMFC and retrial of generation in the DMFC in the power source system of the mobile type information terminal of the second embodiment of this invention. In FIG. 12, ACC corresponds to the ACC signal 35 in FIG. 4 and FIG. 5, and is output from the power source management circuit 21 to the boost DC/DC converter 15 of the fuel cell unit 11. That is to say, in the case where operation of the DMFC 12 is allowed, H is output while if a stop command for the operation of the DMFC 12 is given, L is output. In addition, PG corresponds to the PG signal (logic signal) 36 and is output from the boost DC/DC converter 15 of the fuel cell unit 11 to the power source control circuit 21. That is to say, if the output voltage of the boost DC/DC converter 15 is a prescribed value, H is output, while if there is an abnormal state such as decrease in the output of the boost DC/DC converter 15, L is output. Ic is the charge current command value of the charge control circuits 7a and 7b that is output from the power source management circuit 21.

In FIG. 12, the mobile type information terminal 50 is in the DMFC stop state at first. At this time, the ACC signal is L, the PG is L and the charge current command value Ic is zero (Step S51). At the time of startup, the charge current command value Ic is set at the fixed value I1 (first charge current command value), and the boost DC/DC converter 15 is operated with the ACC signal being H (Step S52), and the process is transferred to the normal charging mode. In the normal charging mode, the lithium ion battery 18a and the lithium ion battery 18b are charged by power generated from the DMFC 12. At this time, the output voltage from the boost DC/DC converter 15 is a prescribed value and thus the PG signal outputs H (Step S53).

At this time, the power source management circuit 21 monitors the PG signal. If the PG signal becomes L (Step S54), the process transfers to the overload (1) mode. In this overload (1) state, the ACC signal is H, the PG signal is L, the charge current command value Ic is a fixed value I1 (Step S55). It is to be noted that overload (1) refers to the case where because the DMFC 12 has not sufficiently started up, the charged power is too large for the amount of power generated by the DMFC 12.

Thus the charge current command value Ic is changed to the fixed value I2 (second charge current command value) which is sufficiently smaller than the fixed value I1 (Step S56), and the process transfers to the aging mode. In the aging mode, the ACC signal is H, the PG signal is H, and the charge current command value Ic is the small fixed value (I2) and the process stays in this mode for 60 seconds (Step S57). It is to be noted that small fixed value (I2) is set to about ⅕ of fixed value I1 for example. As a result, the aging mode selects current with a current density with a comfortable current density from the DMFC 12, and in this mode generating characteristic can be quickly increased based on deterioration due to increase in temperature.

Next, in the aging mode, after 60 second have elapsed, the charge current command value Ic is increased from the small fixed value I2 to the fixed value I1 (Step S58) and the process is transferred to the normal charging mode. It is to be noted that this type of mode transfer is performed up to 30 times. If the Pg signal becomes L, the charge current command value Ic is reduced to the small fixed value I2, and the startup of the DMFC is accelerated in the aging mode. In addition, if it is seen that the PG signal is L in the aging mode (Step S59), the process moves to the overload (2) mode. At this time, ACC signal is H, the PG signal is L and the charge current command value Ic is the fixed value I2 (Step 60).

The boost DC/DC converter 15 is stopped with the ACC signal as L, and at the same time, charging is stopped with the charge current command value Ic as 0 (Step S61), and the process transfers to the standby mode. In the standby mode, the ACC signal is L, the PG signal is L, the charge current command value Ic is 0, and the process stays in this mode for 20 seconds (Step S62). Also, in the standby mode, while the ACC signal is L, after 20 seconds has elapsed, the charge current command value Ic is set to the small fixed value I2, and the process moves to the aging mode (Step S63). It is to be noted that this type of mode transfer is carried out up to 10 times.

Also, when the ACC signal becomes L during normal charging in Step S53, (Step S64), the ACC signal becomes L in overload (1) in Step S55 (Step S65) and the ACC signal becomes L in overload (2) in Step S60, the DMFC 12 is stopped (Step S51). Furthermore, when the ACC signal becomes L in the 31th loop in the aging mode in Step S57, a determination is made that there is an abnormality at the DMFC (Step S67). In addition, if the loop reaches the 11th times in the standby mode of Step S62, a determination is made that there is an abnormality at the DMFC (Step S68).

As described above, according to the mobile type information terminal of this invention, during daytime operation at the display site AC charging is unnecessary and this eliminates complications when the mobile type information terminal is distributed out and returned. In addition, when the mobile type information terminal is distributed to the visitor, by simply pressing a button, the power source comes ON and the information screen for the visitor is automatically displayed and thus the burden on the staff is lightened. Furthermore, when the mobile type information terminal is returned, self diagnosis and turning OFF of the power source is ensured by reading a prescribed RFID chip and thus the work of the staff is simplified and a situation is avoided where the power is inadvertently not turned OFF. In addition, because the state of lithium ion batteries with two systems are automatically switched by SOC determination (state of charge determination), the lithium ion battery that has been used and the state of charge reduced may go into the charge mode immediately after use and thus power output from the DMFC 12 is never wasted.

In addition, because the circuit configuration is such that the load of the mobile type information terminal is not directly connected to the DMFC, the load side devices can be stably driven regardless of the DMFC state. Furthermore the lithium ion batteries can be efficiently AC charged from a commercial power source, and at the time of charging from the commercial power source, and exclusive charge control is performed in which the output current from the DMFC 12 automatically becomes zero. The staff thus does not need to turn the DMFC ON and OFF each time AC charging begins, and thus convenience in using the mobile type information terminal is further improved. In addition, in the mobile type information terminal of this invention, because the plurality of lithium ion batteries each comprise a charge control circuit, a voltage monitoring circuit, and a current integrating circuit, the state of each lithium ion battery can be accurately detected and determined as close power source management is performed. As a result, deterioration of the lithium ion batteries is controlled and the replacement cycle for the lithium ion batteries can be extended, thus lowering running cost.

In addition, because the mobile type information terminal has the function of limiting the output current from the DMFC to a prescribed amount, deterioration of the DMFC is prevented and generation of water from the electrode and overheating is prevented and consequently, the mobile type information terminal can be stably used. Furthermore, in the case where the DMFC abnormally overheats, because protective function is provided using a thermistor or the like, the mobile type information terminal can be stably used. As a result, a favorable system is provided when a mobile type information terminal in which a DMFC is loaded is to be operated at an exposition or exhibition with large capacity for an extended period.

According to the mobile type information terminal of this invention, the fuel cell and the plurality of secondary cells (such as lithium ion cells) are used and even during operation, the fuel cell backup charges one of the secondary cells while power is supplied to the load of the mobile type information terminal by the other secondary cell. For this reason, there is no concern about the battery going dead during use of the mobile type information terminal and thus this invention can be used as a favorable mobile type information terminal which can be operated over a long period in an exhibition or exposition.

What is claimed is:

1. A self diagnosis method for a mobile type information terminal which comprises secondary batteries; a fuel cell; a charging means for charging the secondary batteries from the fuel cell and a boost DC/DC converter which is interposed between the fuel cell and the charging means and has a function for stopping operation when there is an abnormality in the fuel cell; wherein a first charge current command value and a second charge current command value which is smaller than the first charge current command value which is sent by the charging means and a logic signal corresponding to normal/abnormal output voltage of the boost DC/DC converter are utilized and the method comprises:

a step for charging the secondary batteries using the first charge current command value when the fuel cell is started;

a step for changing the charge current command value to the second charge current command value and charging the secondary cells over a prescribed time in the case where the logic signal is a signal that indicates abnormality of the boost DC/DC converter; and a step for charging the secondary batteries by changing the charge current command value back to the first charge current command value after the prescribed time has elapsed.

2. The self diagnosis method for the mobile type information terminal of claim 1, wherein the second charge current command value of not more than ½ of the first charge current command value.

3. The self diagnosis method for the mobile type information terminal of claim 2, wherein if the changing operation for the charge current command value exceeds a prescribed frequency, abnormal information for the fuel cell is stored in a memory means and the abnormal information is displayed at the time of the next self diagnosis.

4. The self diagnosis method for the mobile type information terminal of any of claim 3, wherein in the case where the charge current command value is the second charge current command value, and the logic signal corresponds to an abnormality of the boost DC/DC converter, the charging means and the boost DC/DC converter are stopped, and after a prescribed time has elapsed, operation of the boost DC/DC converter is resumed and the secondary batteries are charged at the second charge current command value.

5. The self diagnosis method for the mobile type information terminal of claims 4, wherein when stopping of the charging means exceeds a prescribed frequency, abnormal information for the fuel cell is stored in the memory means and the abnormal information displayed at the time of the next self diagnosis.

* * * * *